(12) United States Patent
Kang

(10) Patent No.: US 11,852,716 B2
(45) Date of Patent: Dec. 26, 2023

(54) APPARATUS AND METHOD FOR MONITORING SURROUNDING ENVIRONMENT OF VEHICLE

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/870,363

(22) Filed: Jul. 21, 2022

(65) Prior Publication Data

US 2023/0022335 A1 Jan. 26, 2023

(30) Foreign Application Priority Data

Jul. 21, 2021 (KR) .................. 10-2021-0095582

(51) Int. Cl.
*G01S 13/89* (2006.01)
*B60W 40/02* (2006.01)
*G01S 13/06* (2006.01)

(52) U.S. Cl.
CPC ............ *G01S 13/89* (2013.01); *B60W 40/02* (2013.01); *G01S 13/06* (2013.01); *B60W 2420/52* (2013.01)

(58) Field of Classification Search
CPC .......... G01S 13/89; G01S 13/06; G01S 13/42; G01S 2013/9314; G01S 13/52; G01S 13/931; G01S 13/87; G01S 2013/9315; B60W 40/02; B60W 2420/52; B60W 50/045; B60W 2420/00; B60W 2554/20
See application file for complete search history.

(56) References Cited

U.S. PATENT DOCUMENTS

| | | | | |
|---|---|---|---|---|
| 10,286,913 | B2* | 5/2019 | Saigusa | B60W 30/0956 |
| 2010/0057361 | A1* | 3/2010 | Caveney | B60W 30/08 |
| | | | | 701/469 |
| 2014/0236414 | A1* | 8/2014 | Droz | G08G 1/015 |
| | | | | 701/1 |
| 2014/0278052 | A1* | 9/2014 | Slavin | G01C 21/3492 |
| | | | | 701/400 |
| 2019/0346854 | A1* | 11/2019 | Slutsky | G01S 13/931 |
| 2020/0019165 | A1* | 1/2020 | Levandowski | B60W 50/00 |
| 2020/0103523 | A1* | 4/2020 | Liu | G01S 13/865 |

(Continued)

FOREIGN PATENT DOCUMENTS

KR 10-2021-0077367 A 6/2021

*Primary Examiner* — Mussa A Shaawat
(74) *Attorney, Agent, or Firm* — NSIP Law

(57) ABSTRACT

Disclosed herein are an apparatus and method for monitoring a surrounding environment of a vehicle, the apparatus including a sensor unit including a plurality of detection sensors for detecting an object outside a vehicle according to a frame at a predefined period, and a controller configured to extract a stationary object from among the outside objects detected by the sensor unit, to map the extracted stationary object to a grid map, to calculate an occupancy probability parameter, indicative of a probability that the stationary object will be located on a grid of the grid map, from the result of mapping, and to monitor the surrounding environment of the vehicle by specifying a grid on which the stationary object is located in the grid map, based on the occupancy probability parameter.

16 Claims, 39 Drawing Sheets

(56) References Cited

U.S. PATENT DOCUMENTS

| | | | |
|---|---|---|---|
| 2020/0365029 A1* | 11/2020 | Kourous-Harrigan | ................... G08G 1/163 |
| 2021/0031795 A1* | 2/2021 | Bariant | ............... B60W 60/001 |
| 2021/0183241 A1* | 6/2021 | Lee | ........................... G06T 7/73 |
| 2021/0208242 A1* | 7/2021 | Sudarsan | ............... G01S 13/584 |
| 2021/0231769 A1* | 7/2021 | Zaum | .................... G01S 15/931 |
| 2021/0241026 A1* | 8/2021 | Deng | ...................... G01S 13/87 |
| 2021/0286068 A1* | 9/2021 | Kumar | ................. G01S 13/931 |
| 2021/0354708 A1* | 11/2021 | Gyllenhammar | ....... H04W 4/46 |
| 2022/0126837 A1* | 4/2022 | Croxford | ............. B60W 50/16 |

\* cited by examiner $K^{th}$ Frame

K$^{th}$ Frame

FIG. 12

| Waveform Type | Detection Probability | Occupancy Probability Parameter in Grid Map | Mapping Index for Frame | | |
|---|---|---|---|---|---|
| | | | $(K-2)^{th}$ Frame | $(K-1)^{th}$ Frame | $K^{th}$ Frame |
| Single Waveform (1) | $P_d$ | | i+1, j | i+1, j | i+1, j |
| Multiple Waveforms | $\dfrac{P_d}{3(=N_{wave})}$ | | i-1, j | i, j | i+1, j |

Different indexes are mapped to respective frames

FIG. 14

| Waveform Type | Detection Probability | Occupancy Probability Parameter in Grid Map | Mapping Index for Frame | | |
|---|---|---|---|---|---|
| | | | $(K-2)^{th}$ Frame | $(K-1)^{th}$ Frame | $K^{th}$ Frame |
| Multiple Waveforms 3(= Nwave) | $P_d$ | ① Mapping Area Expansion  ② Occupancy Probability Parameter | [i−2~i+1, j−1~j+1] | [i−1~i+1, j−1~j+1] | [i−i+2, j−1~j+1]  Different indexes are mapped to respective frames, but expanded mapping area is set |

Before update error correction

After update error correction

FIG. 20

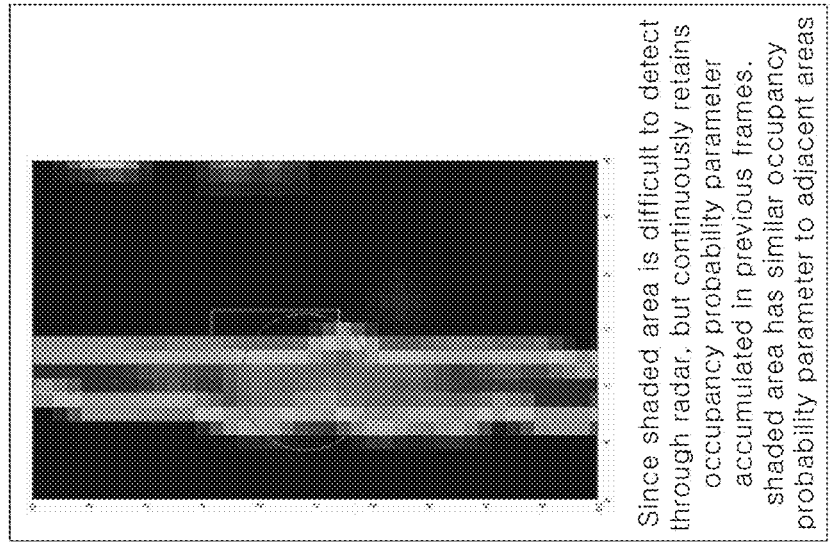

After shaded area correction

Since shaded area is difficult to detect through radar, but continuously retains occupancy probability parameter accumulated in previous frames, shaded area has similar occupancy probability parameter to adjacent areas

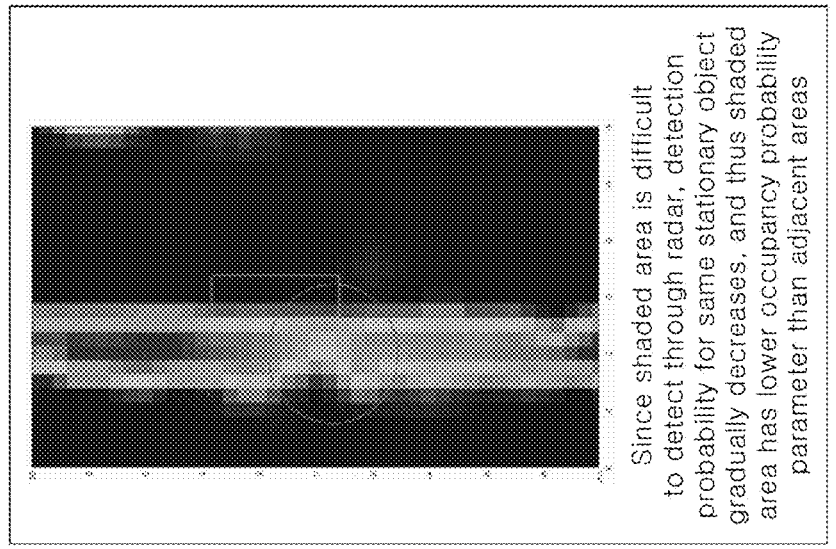

Before shaded area correction

Since shaded area is difficult to detect through radar, detection probability for same stationary object gradually decreases, and thus shaded area has lower occupancy probability parameter than adjacent areas

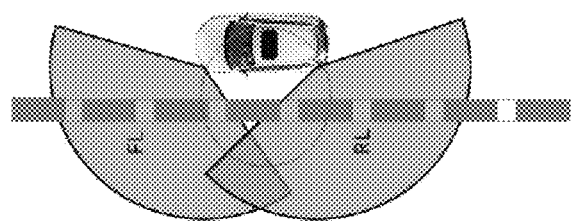

$$EdgeFlag(i,j) = \begin{matrix} 1, if(\sum_{k=i-1}^{i+1}\sum_{r=j-1}^{j+1} D_{map}(k,r) < 9) \\ 0, else \end{matrix}$$

$$EdgeFlag(i,j) = \begin{matrix} 1, if(\sum_{k=i-1}^{i+1}\sum_{r=j-1}^{j+1} D_{map}(k,r) < 9) \\ 0, else \end{matrix}$$

$$EdgeFlag(i,j) = \begin{matrix} 1, if(\sum_{k=i-1}^{i+1}\sum_{r=j-1}^{j+1} D_{map}(k,r) < 9) \\ 0, else \end{matrix}$$

① TRACKING GATE FORM

ⓐ ORTHOGONAL PARKING: FORM OF ELLIPSE WITH TRANSVERSE MAJOR AXIS

ⓑ DIAGONAL PARKING: FORM OF ELLIPSE WITH DIAGONAL MAJOR AXIS

ⓒ PARALLEL PARKING: FORM OF ELLIPSE WITH LONGITUDINAL MAJOR AXIS

ORTHOGONAL PARKING

FIG. 32

3) COMPARISON OF ORTHOGONAL PARKING AND DIAGONAL PARKING

| | ORTHOGONAL | DIAGONAL |
|---|---|---|
| $\Delta Xedge$ | 3.5 | 12 |
| $\Delta Yedge$ | 18 | 23 |
| *IncidentRatiobRange* | | |
| $std(Xedge\_ID(:))$ | 0.56 | 3.3952 |
| $std(Yedge\_ID(:))$ | 5.4712 | 6.8982 |
| *IncidentRatiobSTD* | | |

APPARATUS AND METHOD FOR MONITORING SURROUNDING ENVIRONMENT OF VEHICLE

CROSS-REFERENCE TO RELATED APPLICATION

This application claims the benefit under 35 USC § 119(a) of Korean Patent Application No. 10-2021-0095582, filed on Jul. 21, 2021, the entire disclosure of which is incorporated herein by reference for all purposes.

BACKGROUND

Field

Exemplary embodiments of the present disclosure relate to an apparatus and method for monitoring the surrounding environment of a vehicle, and more particularly, to an apparatus and method for monitoring the surrounding environment of a vehicle by using an OGM (Occupancy Grid Map).

Description of Related Art

A radar for a vehicle refers to a device that detects an outside object within a detection area when the vehicle travels, and warns a driver to help the driver to safely drive the vehicle. FIGS. 1A and 1B illustrate areas to which general radars for a vehicle transmit radar signals to detect an outside object. The radar for a vehicle operates to transmit a radar signal according to a frame with a predefined period, and detect an outside object. As illustrated in FIG. 1B, the signal characteristics of the transmitted radar signal, such as a waveform, frequency, distance resolution, angle resolution, maximum sensing distance, and FoV (Field of View), are different depending on a system of the vehicle, to which the radar is applied. Examples of the system include a DAS (Driver Assistance System) such as BSD (Blind Spot Detection), LCA (Lane Change Assistance), or RCTA (Rear Cross Traffic Alert).

The related art of the present disclosure is disclosed in Korean Patent Application Laid-Open No. 10-2013-0130843 published on Dec. 2, 2013.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for monitoring a surrounding environment of a vehicle, including a sensor unit including a plurality of detection sensors for detecting an object outside a vehicle according to a frame at a time period, and a controller configured to extract a stationary object from among the outside objects detected by the sensor unit, map the extracted stationary object to a grid map, calculate an occupancy probability parameter, indicative of a probability of the stationary object being located on a grid of the grid map, from a result of mapping, and monitor the surrounding environment of the vehicle by specifying the grid on which the stationary object is located in the grid map, based on the occupancy probability parameter, apply a clustering algorithm to the specified grid to create a cluster composed of a plurality of grids having the same characteristic, determine a type of parking in a parking space by extracting an edge grid of the cluster to detect a plurality of other vehicles continuously parked around the vehicle, and control a function of a rear cross traffic alert (ROTA) system, in response to the type of parking.

The controller may be configured to determine a peak grid with a maximum occupancy probability parameter from among grids in the grid map, and to determine that the stationary object is located on the peak grid, in response to the occupancy probability parameter of the peak grid being equal to or greater than a threshold value for the peak grid, and the peak grid on which the stationary object is determined to be located may include a plurality of peak grids.

The controller may be configured to use a density based spatial clustering of applications with noise (DBSCAN) algorithm as the clustering algorithm to create one or more clusters, and the clustering criterion of the DBSCAN algorithm corresponds to a distance between the plurality of peak grids where the stationary object is determined to be located.

The controller may be configured to extract grids in which a peak grid does not exist in an immediately adjacent grid, as edge grids of each cluster, from among the grids constituting the cluster, and determine nearest edge grids, which are at positions closest to the vehicle, from among the extracted edge grids, and to determine the nearest edge grids as grids on which the plurality of other vehicles are continuously parked around the vehicle are located, in response to the nearest edge grids being continuously arranged.

The controller may be configured to determine the type of parking in the parking space, based on a first ratio between longitudinal and transverse lengths of the plurality of other vehicles corresponding to the continuously arranged nearest edge grids and a second ratio between a standard deviation of longitudinal positions and a standard deviation of transverse positions of the plurality of other vehicles.

The controller may be configured to determine the type of parking in the parking space by determining a parking angle corresponding to the first and second ratios using a parking angle function in relation to a combination of the first and second ratios and comparing the parking angle with a threshold value, and the type of parking may include one of orthogonal parking, diagonal parking, and parallel parking.

The controller may be configured to correct a form of a tracking gate of the ROTA for tracking a target vehicle moving in the parking space based on the type of parking in the parking space.

The controller may be configured to correct the tracking gate in the form of an ellipse with a transverse major axis, an ellipse with a diagonal major axis, and an ellipse with a longitudinal major axis, in response to the type of parking in the parking space being one of the orthogonal parking, the diagonal parking, and the parallel parking, respectively.

In another general aspect, there is provided a processor-implemented method of monitoring a surrounding environment of a vehicle, including extracting, by a controller, a stationary object from among objects, outside a vehicle, detected by a sensor unit including a plurality of detection sensors for detecting the outside objects of the vehicle according to a frame at a time period, mapping, by the controller, the extracted stationary object to a preset grid map, calculating, by the controller, an occupancy probability parameter indicative of a probability that the stationary object being located on a grid of the grid map from a result of mapping, monitoring, by the controller, the surrounding environment of the vehicle by specifying the grid on which the stationary object is located in the grid map, based on the occupancy probability parameter, creating, by the controller, a cluster composed of a plurality of grids having the same characteristic by applying a predefined clustering algorithm to the specified grid, determining, by the controller, a type of parking in a parking space by extracting an edge grid of the cluster to detect a plurality of other vehicles continuously parked around the vehicle, and controlling, by the controller, a function of a rear cross traffic alert (ROTA) system in response to the type of parking.

The monitoring of the surrounding environment of the vehicle may include determining a peak grid with a maximum occupancy probability parameter from among grids in the grid map, and determining that the stationary object is located on the peak grid, in response to the occupancy probability parameter of the peak grid being equal to or greater than a threshold value defined for the peak grid, and the peak grid on which the stationary object is determined to be located may include a plurality of peak grids.

The creating of the cluster may include using a density based spatial clustering of applications with noise (DBSCAN) algorithm as the clustering algorithm to create one or more clusters, and the clustering criterion of the DBSCAN algorithm corresponds to a distance between the plurality of peak grids where the stationary object is determined to be located.

The determining of the type of parking in the parking space may include extracting grids in which a peak grid does not exist in an immediately adjacent grid, as edge grids of each cluster, from among the grids constituting the cluster, and determining nearest edge grids, which are at positions closest to the vehicle, from among the extracted edge grids, and determining those nearest edge grids as grids on which the plurality of other vehicles are continuously parked around the vehicle are located, in response to the determined nearest edge grids being continuously arranged.

The determining of the type of parking in the parking space may include determining the type of parking in the parking space, based on a first ratio between longitudinal and transverse lengths of the plurality of other vehicles corresponding to the continuously arranged nearest edge grids and a second ratio between a standard deviation of longitudinal positions and a standard deviation of transverse positions of the plurality of other vehicles.

The determining of the type of parking in the parking space may include determining the type of parking in the parking space by determining a parking angle corresponding to the first and second ratios using a parking angle function in relation to a combination of the first and second ratios and comparing the parking angle with a threshold value, and the type of parking may include one of orthogonal parking, diagonal parking, and parallel parking.

The controlling of the function of the rear cross traffic alert (ROTA) system may include correcting a form of a tracking gate of the ROTA for tracking a target vehicle moving in the parking space based on the type of parking in the parking space.

The controlling of the function of the rear cross traffic alert (ROTA) system may include correcting the tracking gate in the form of an ellipse with a transverse major axis, an ellipse with a diagonal major axis, and an ellipse with a longitudinal major axis, in response to the type of parking in the parking space being one of the orthogonal parking, the diagonal parking, and the parallel parking, respectively.

BRIEF DESCRIPTION OF THE DRAWINGS

FIGS. 12 to 14 are diagrams illustrating a process of deciding an expanded mapping area in the apparatus for monitoring the surrounding environment of a vehicle in accordance with the embodiment of the present disclosure.

FIGS. 17 to 20 are diagrams illustrating a process of correcting a shaded grid in the apparatus for monitoring the surrounding environment of a vehicle in accordance with the embodiment of the present disclosure.

FIGS. 27 to 32 are diagrams illustrating a process of performing ROTA function control in the apparatus for monitoring the surrounding environment of a vehicle in accordance with the embodiment of the present disclosure.

Figure 1A:
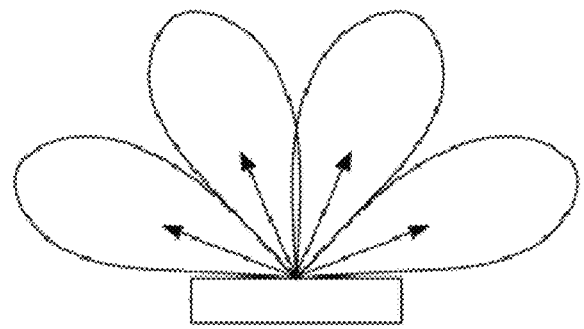
FIGS. 1A and 1B are diagrams illustrating areas to which general radars for a vehicle transmit radar signals to detect an outside object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Figure 2:
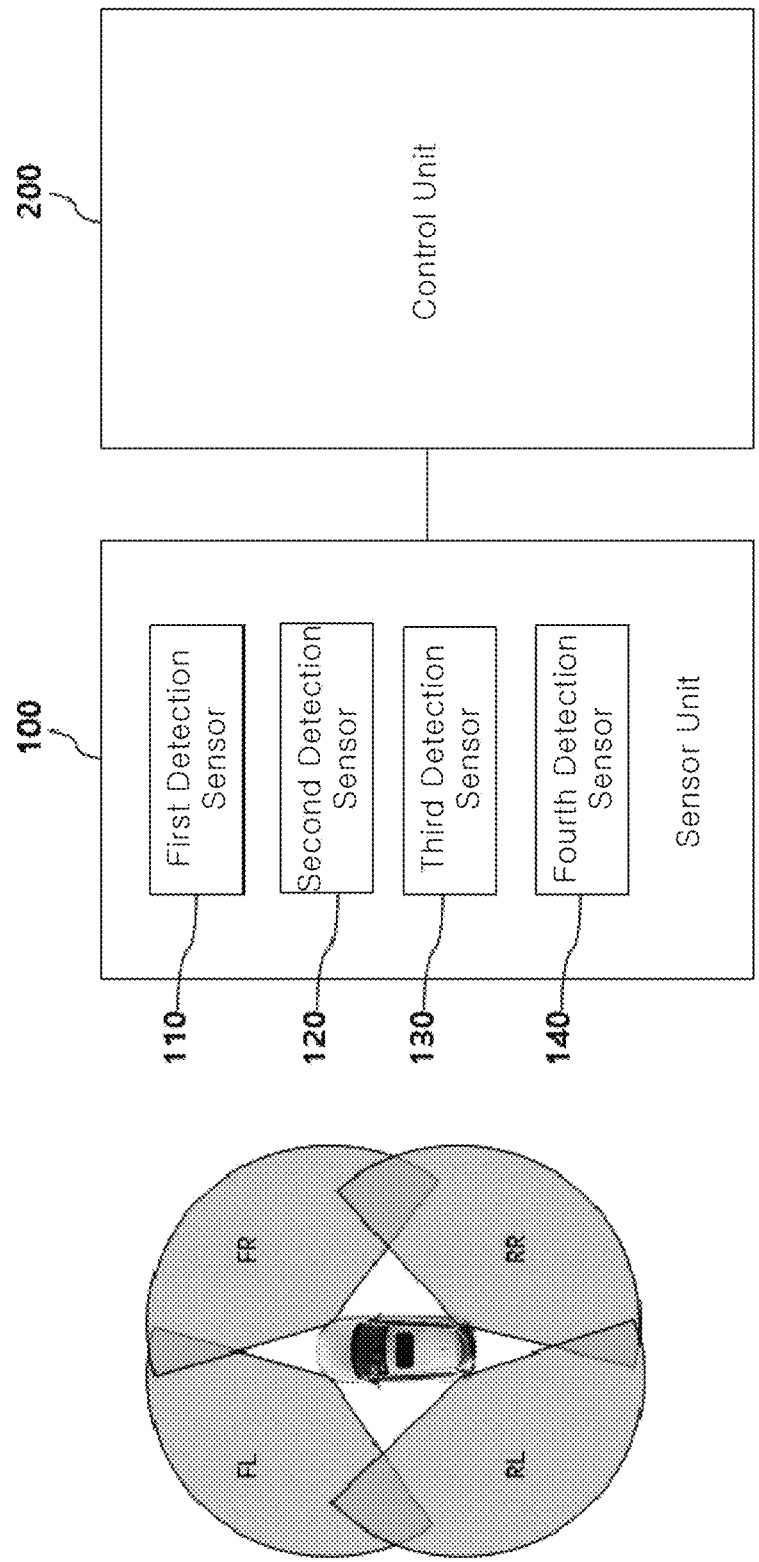
FIG. 2 is a block configuration diagram for describing an apparatus for monitoring the surrounding environment of a vehicle in accordance with an embodiment of the present disclosure.
Figure 3:
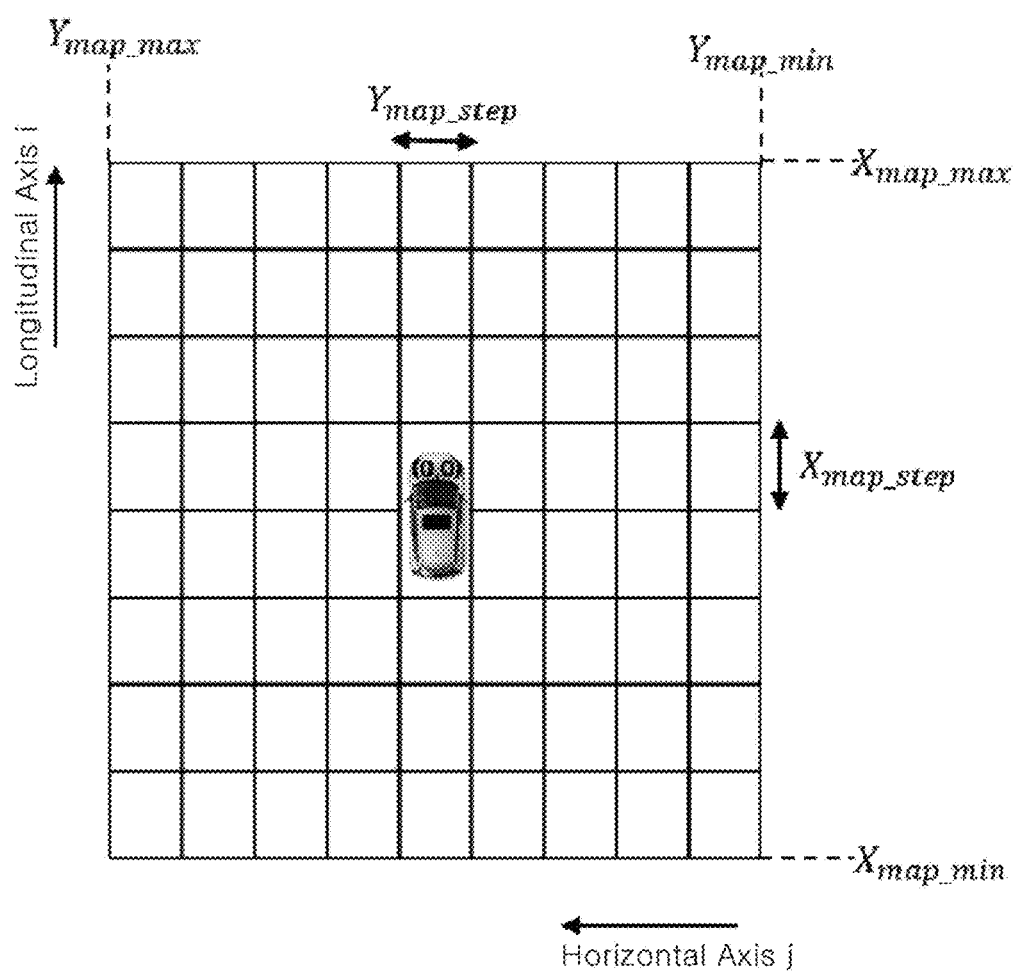
FIG. 3 is a diagram illustrating a grid map in the apparatus for monitoring the surrounding environment of a vehicle in accordance with the embodiment of the present disclosure.
Figure 7:
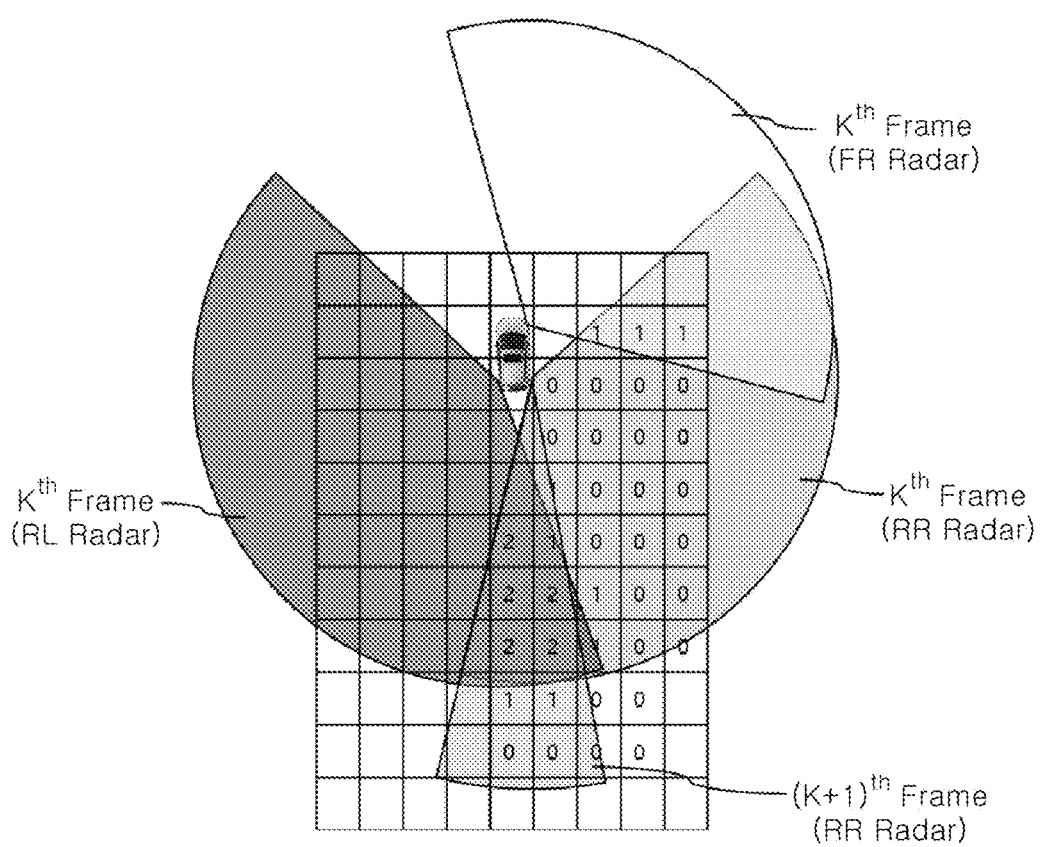
Figure 8:
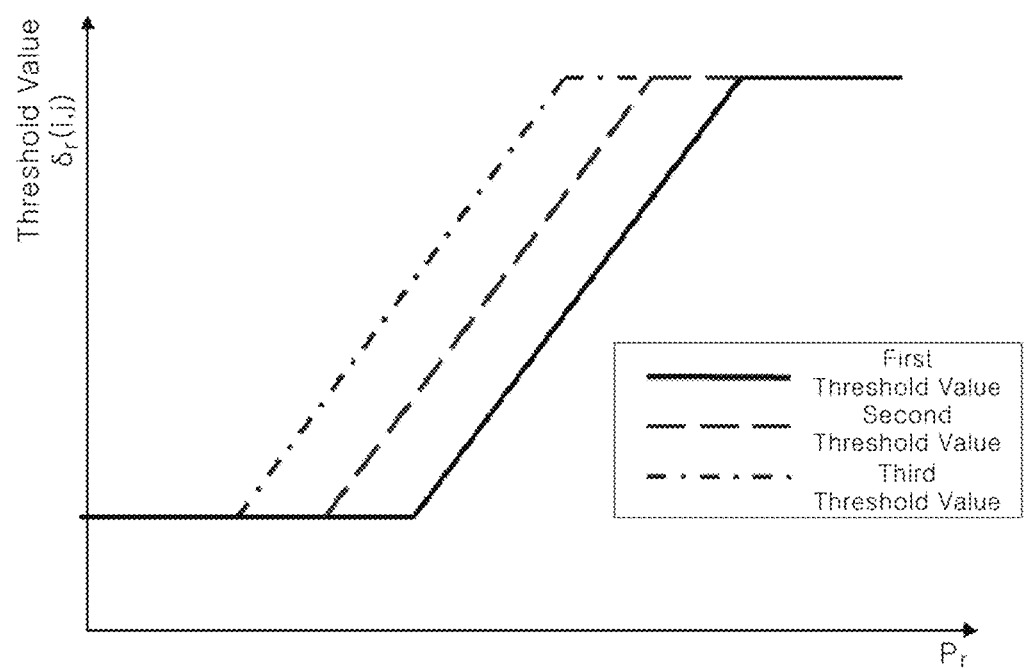
Figure 9A:
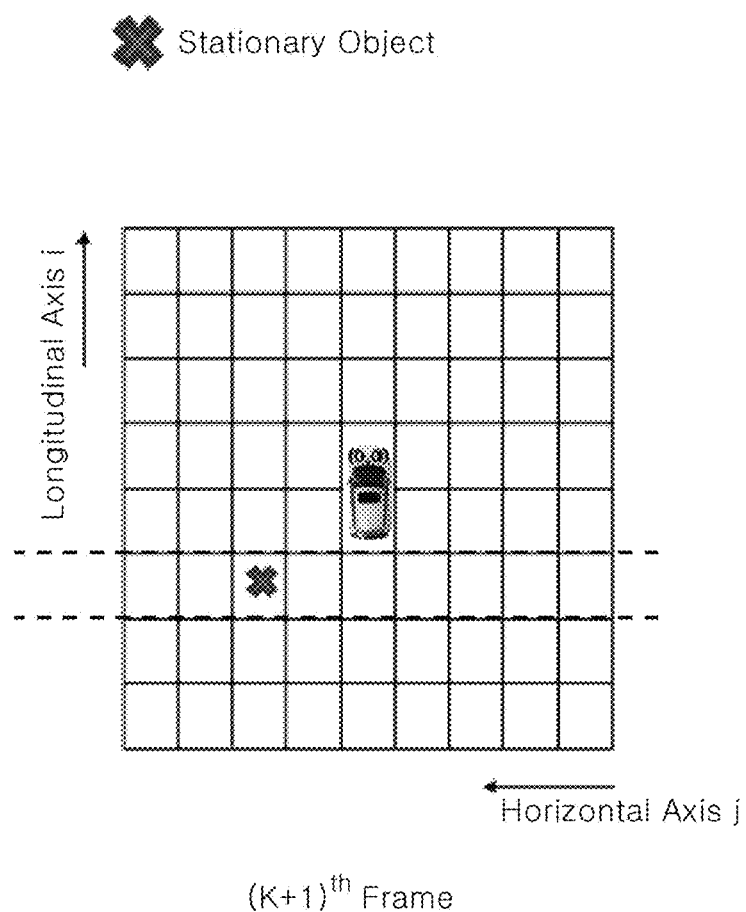
FIGS. 9A to 10 are diagrams illustrating a process of updating the grid map in the apparatus for monitoring the surrounding environment of a vehicle in accordance with the embodiment of the present disclosure.
Figure 9B:
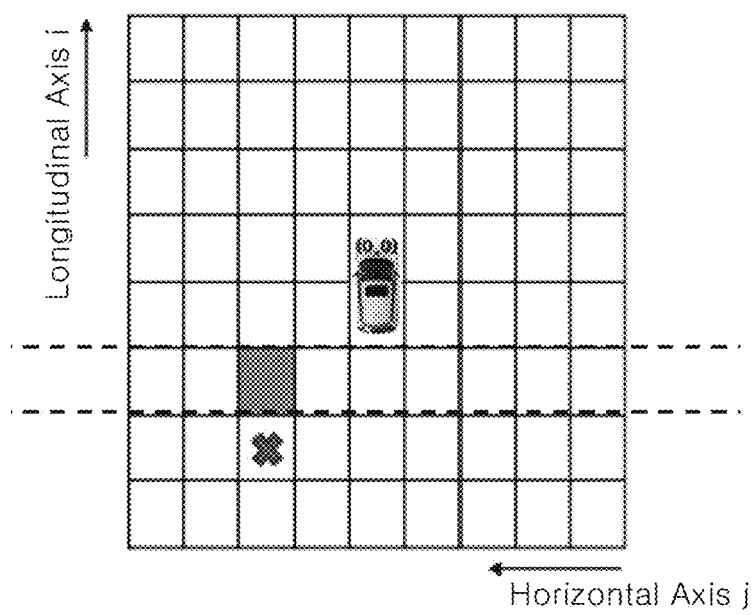
Figure 9C:
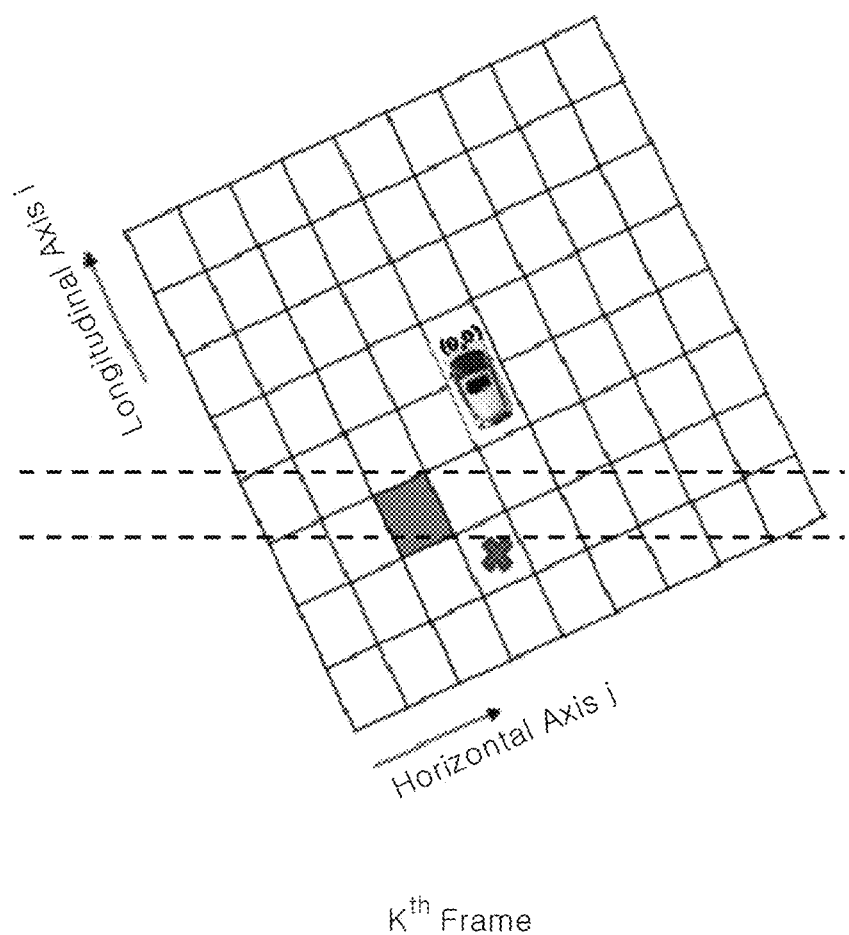
Figure 10:
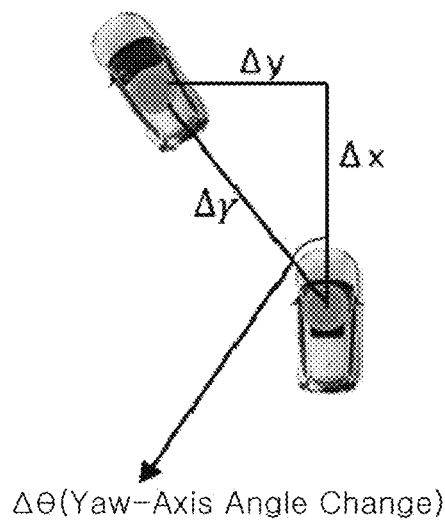
Figure 11:
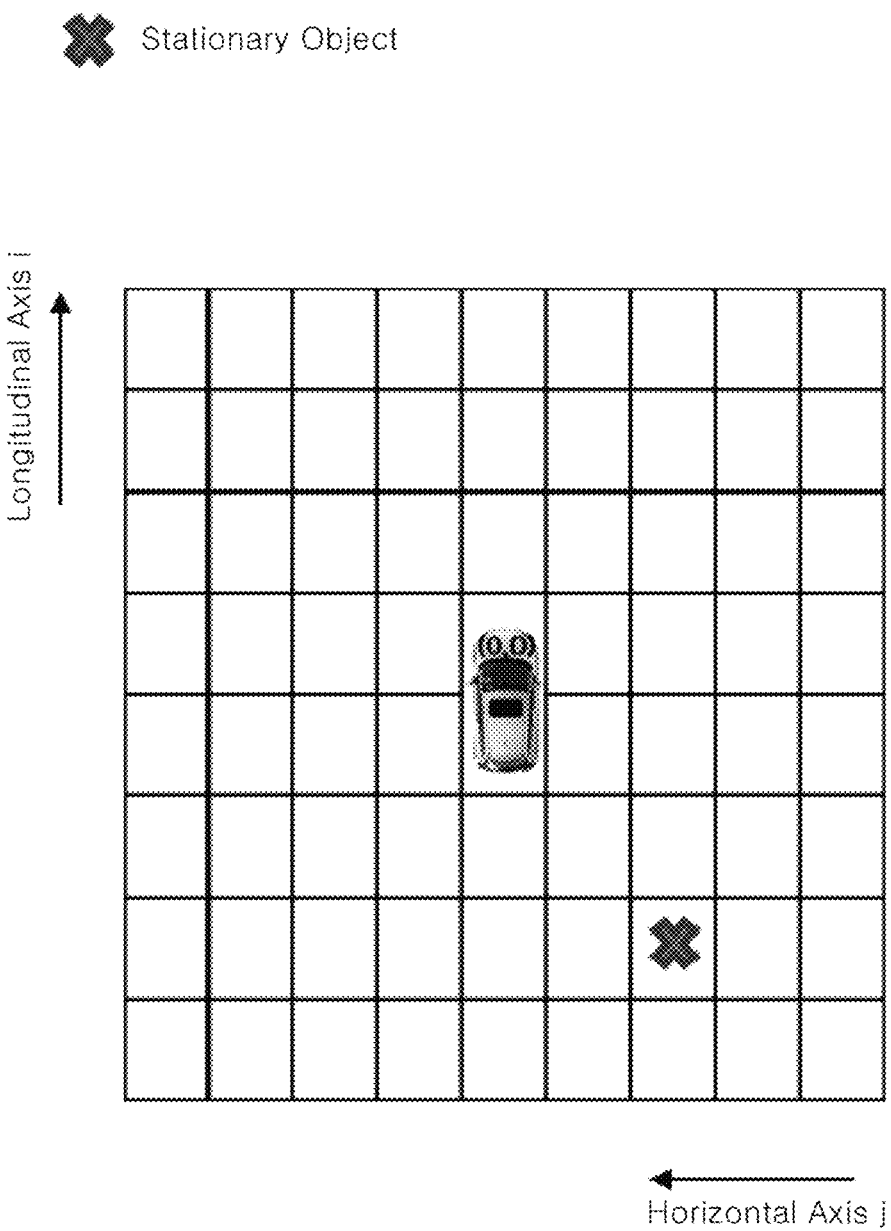
FIG. 11 is a diagram illustrating a process of mapping a stationary object to the grid map in the apparatus for monitoring the surrounding environment of a vehicle in accordance with the embodiment of the present disclosure.
Figure 13:
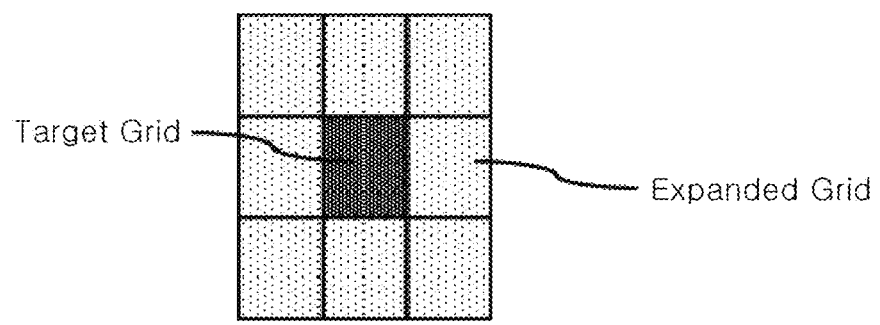
Figure 15:
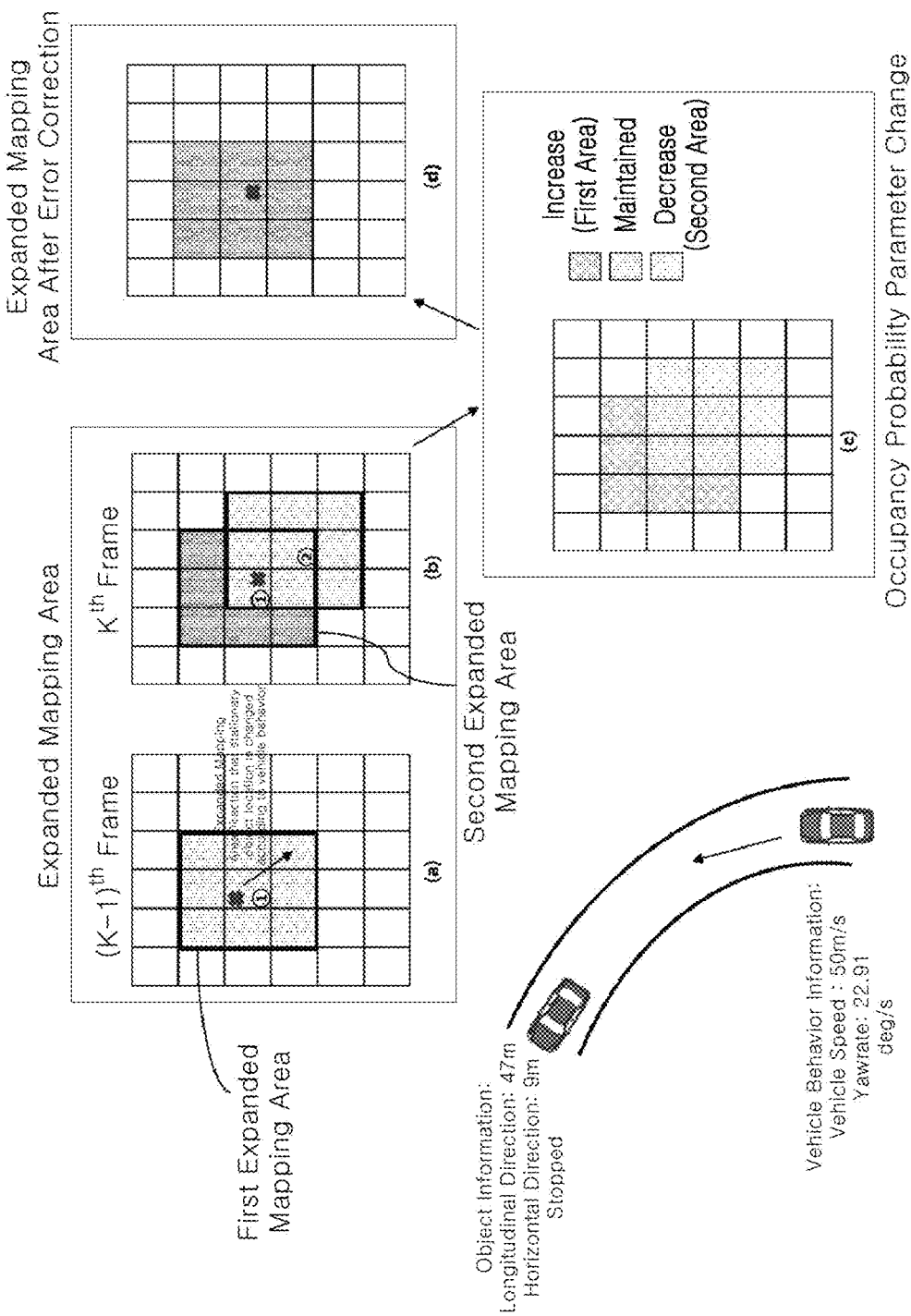
FIGS. 15 to 16B are diagrams illustrating a process of correcting an occupancy probability parameter in the apparatus for monitoring the surrounding environment of a vehicle in accordance with the embodiment of the present disclosure.
Figure 16A:
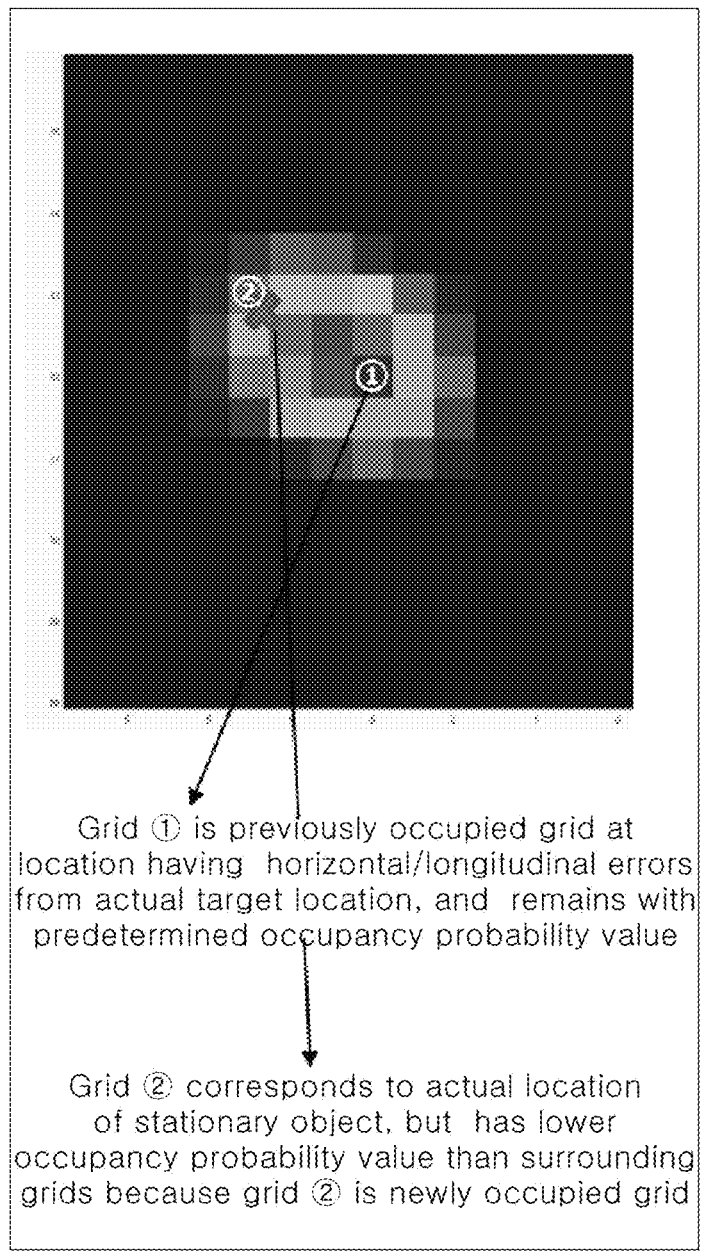
Figure 16B:
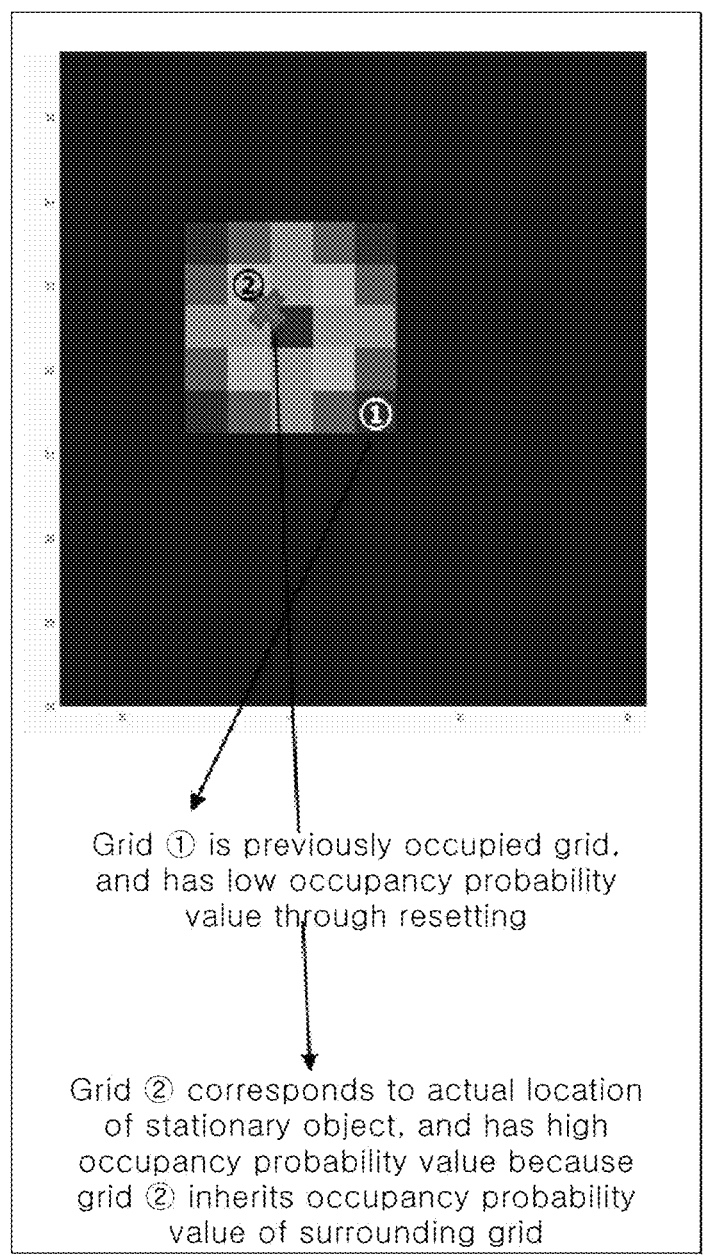

FIG. 2 is a block configuration diagram for describing an apparatus for monitoring the surrounding environment of a vehicle in accordance with an embodiment of the present disclosure, FIG. 3 is a diagram illustrating a grid map in the apparatus for monitoring the surrounding environment of a vehicle in accordance with the embodiment of the present disclosure, FIGS. 4 to 8 are diagrams illustrating a process of setting threshold values of the grid map in the apparatus for monitoring the surrounding environment of a vehicle in accordance with the embodiment of the present disclosure, FIGS. 9A to 10 are diagrams illustrating a process of updating the grid map in the apparatus for monitoring the surrounding environment of a vehicle in accordance with the embodiment of the present disclosure, FIG. 11 is a diagram illustrating a process of mapping a stationary object to the grid map in the apparatus for monitoring the surrounding environment of a vehicle in accordance with the embodiment of the present disclosure, FIGS. 12 to 14 are diagrams illustrating a process of deciding an expanded mapping area in the apparatus for monitoring the surrounding environment of a vehicle in accordance with the embodiment of the present disclosure, FIGS. 15, 16A, and 16B are diagrams illustrating a process of correcting an occupancy probability parameter in the apparatus for monitoring the surrounding environment of a vehicle in accordance with the embodiment of the present disclosure, and FIGS. 17 to 20 are diagrams illustrating a process of correcting a shaded grid in the apparatus for monitoring the surrounding environment of a vehicle in accordance with the embodiment of the present disclosure. FIGS. 21 to 26 are diagrams illustrating a process of monitoring a continuous structure in the apparatus for monitoring the surrounding environment of a vehicle in accordance with the embodiment of the present disclosure.

Referring to FIG. 2, the apparatus for monitoring the surrounding environment of a vehicle in accordance with the embodiment of the present disclosure may include a sensor unit 100 and a control unit 200 (may also be referred to as the controller 200).

Figure 1B:
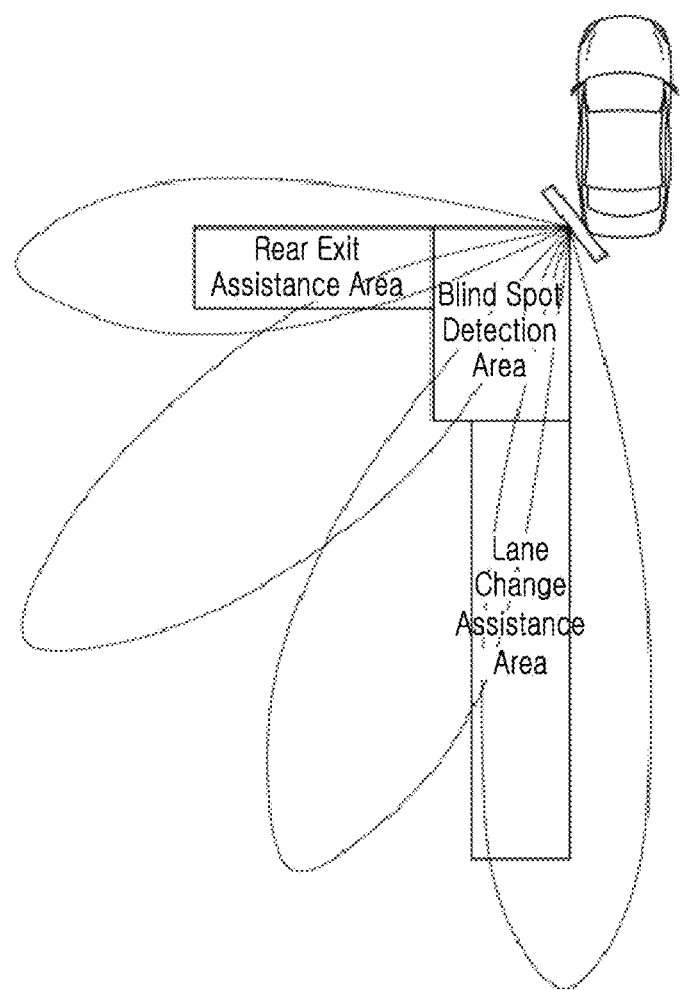

The sensor unit 100 may include first to fourth detection sensors 110, 120, 130, and 140 corresponding to radar sensors of the vehicle. As illustrated in FIG. 2, the first detection sensor 110 may correspond to a rear right (RR) radar sensor, the second detection sensor 120 may correspond to a rear left (RL) radar sensor, the third detection sensor 130 may correspond to a front right (FR) radar sensor, and the fourth detection sensor 140 may correspond to a front left (FL) radar sensor. Therefore, the detection sensors 110, 120, 130, and 140 may operate to detect an outside object through a method of transmitting a radar signal according to frames with a predefined period and receiving a signal reflected from the outside object. Furthermore, depending on a DAS (Driver Assistance System) (e.g. BSD, LCA or ROTA) to which a radar sensor is applied as illustrated in FIGS. 1A and 1B, the waveform, frequency, distance resolution, angle resolution, maximum sensing distance, and FoV of a radar signal transmitted from the radar sensor may have different characteristics for the respective frames.

The control unit 200 serves to monitor the surrounding environment of the vehicle by controlling an operation of the DAS of the vehicle, and may be implemented as an ECU (Electronic Control Unit), processor, CPU (Central Processing Unit) or SoC (System on Chip). The control unit 200 may drive an operating system or application to control a plurality of hardware components or software components connected to the control unit 200, and perform various data processing operations.

In the present embodiment, the control unit 200 may operate to extract a stationary object among outside objects detected by the sensor unit 100 by using behavior information of the vehicle, map the extracted stationary object to a preset grid map, and add occupancy information to each of grids constituting the grid map depending on whether the stationary object is mapped to the grid map. Furthermore, the control unit 200 may operate to calculate an occupancy probability parameter indicating the probability that the stationary object will be located at each of the grids, from the occupancy information added to the grids within the grid map in a plurality of frames to be monitored, and monitor the surrounding environment of the vehicle on the basis of the calculated occupancy probability parameter.

Hereafter, the process of monitoring the surrounding environment of the vehicle will be described in detail for each of the detailed operations of the control unit 200.

1. Stationary Object Extraction

First, the control unit 200 may extract a stationary object among outside objects detected by the sensor unit 100 by using behavior information of the vehicle and object information acquired on the basis of a result obtained by detecting the outside objects through the sensor unit 100. That is, the descriptions of the present embodiment will be focused on the configuration for monitoring a stationary object, not a moving object, among various outside objects around the vehicle.

The behavior information of the vehicle may include a vehicle speed, yaw rate, speed change information, and steering angle, and the object information may include the number of outside objects detected by the sensor unit 100, the longitudinal distance and horizontal distance to each of the objects, the longitudinal speed and horizontal speed of each of the objects, and the intensity of a received signal. The control unit 200 may extract only a stationary object among the outside objects by using the behavior information of the vehicle and the object information. For example, the control unit 200 may distinguish between a moving object and a stationary object by analyzing the relationships between the vehicle speed of the vehicle and the longitudinal/horizontal speeds of the objects, in order to extract only the stationary object.

2. Stationary Object Mapping

When the stationary object is extracted, the control unit 200 may map the extracted stationary object to the preset grid map. Before the mapping process for the stationary object, the grid map and an update process for the grid map will be preferentially described.

2-1. Grid Map

As illustrated in FIG. 3, the grid map may be set in the control unit 200 in advance, and have a size corresponding to the surrounding environment area of the vehicle, which is to be monitored. In FIG. 3, $X_{map\_max}$ represents the maximum distance in the longitudinal direction (the longitudinal size of the grid map), $Y_{map\_max}$ represents the maximum distance in the horizontal direction (the horizontal size of the grid map), $X_{map\_min}$ represents a longitudinal reference position of the grid map, $Y_{map\_min}$ represents a horizontal reference position of the grid map, $X_{map\_step}$ represents the longitudinal size of each grid, and $Y_{map\_step}$ represents the horizontal size of each grid.

The longitudinal and horizontal axes of the grid map may be set on the basis of the vehicle. If the longitudinal and horizontal axes of the grid map are set on the basis of a specific point, not the vehicle, more memory resources may be required depending on the mileage of the vehicle. Furthermore, it is effective to set, to the surrounding area of the vehicle, a surrounding environment monitoring area required for outputting a warning to a driver or performing a traveling control operation of the vehicle. Therefore, the longitudinal and horizontal axes of the grid map may be set on the basis of the vehicle. Thus, the indexes (coordinates (i, j)) of the grids constituting the grid map may also be set on the basis of the vehicle, where i and j represent the longitudinal and horizontal indexes, respectively.

Figure 4:
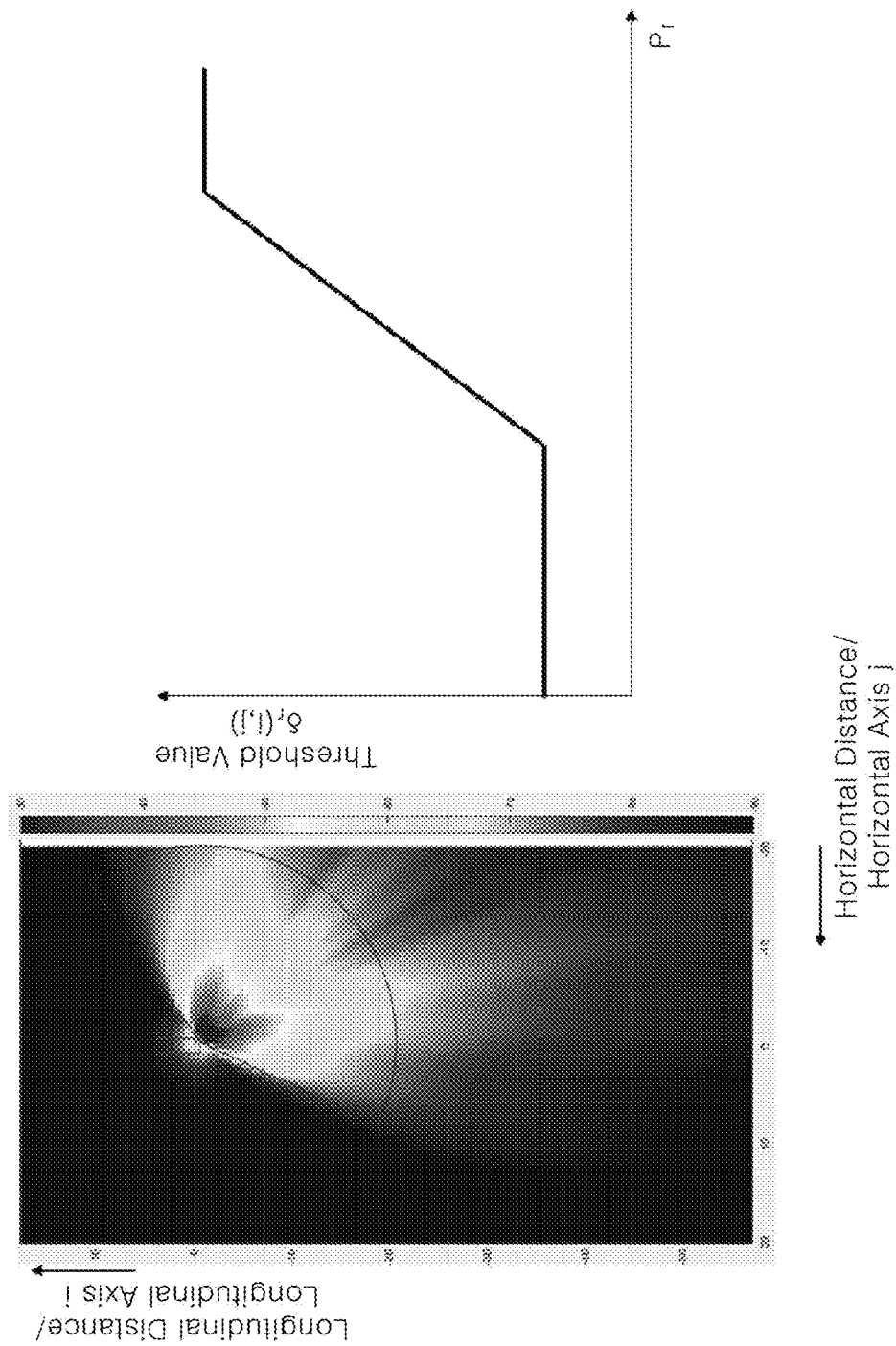
FIGS. 4 to 8 are diagrams illustrating a process of setting threshold values of the grid map in the apparatus for monitoring the surrounding environment of a vehicle in accordance with the embodiment of the present disclosure.

As illustrated in FIG. 4, a threshold value for deciding whether a stationary object occupies each of the grids within the grid map may be defined for the corresponding grid in the grid map. As will be described below, the threshold value functions as a value which is compared to an occupancy probability parameter, and serves as a reference value for determining whether the stationary object is located at the corresponding grid. The threshold value may be defined for each of the grids on the basis of a mathematical model according to the intensity of a received signal inputted to the sensor unit 100, and the mathematical model may correspond to a well-known radar equation below, where Pr represents the intensity of the received signal, Gt represents an antenna gain, and Rt represents the distance to the object:

$$P_r \propto G_{t,r}(\theta), \frac{1}{R_t^4}.$$

Specifically, according to the radar equation, the intensity of the received signal may differ depending on the antenna gain and the relative distance to the object. Therefore, the probability that the same object will be detected through the radar may differ depending on the location thereof. For example, when an object is located at a short distance, the intensity of a received signal is so high that the object detection probability increases, and when an object is located at a long distance, the intensity of a received signal is so low that the object detection probability decreases.

Furthermore, when an object is located at a location where the antenna gain is high, the intensity of a received signal is so high that the object detection probability increases, and when an object is located at a location where the antenna gain is low, the intensity of a received signal is so low that the object sensing detection decreases. As described above, the waveform, frequency, distance resolution, angle resolution, maximum sensing distance, and FoV of a radar signal transmitted from the radar may have different characteristics for the respective frames, depending on the DAS (e.g. BSD, LCA or ROTA) of the vehicle, to which the radar sensor is applied. Thus, each of the frames may include an area where an object can be repeatedly detected, and only a specific frame may include an area where an object can be detected. Therefore, the area which is repeated in each of the frames may have a high object detection probability, and the area which is not repeated in each of the frames may have a low object detection probability. That is because, during two frames, an object can be detected twice in an area which is repeated, but an object can be detected only once in an area which is not repeated.

Furthermore, for two adjacent radar sensors, for example, the RR radar sensor and the RL radar sensor, there may be an area where an object can be redundantly detected through the two radar sensors, and an area where an object can be detected only through one radar sensor. Therefore, the area where the object can be redundantly detected through the two radar sensors may have a high object detection probability, and the area where the object can be detected only through one radar sensor may have a low object detection probability. That is because, although one radar sensor does not detect the object in the area where the object can be redundantly detected through the two radar sensors, the object can be detected through the other adjacent radar sensor, but when one radar sensor does not detect the object in the area where the object can be detected only through one radar sensor, the object cannot be detected through the other adjacent radar sensor.

Through the above-described contents, two situations may be considered.

i) Case in which the object detection probability is the highest: an 'area where an object is located at a short distance and the antenna gain is high', a 'detection area repeated in each frame', and a 'detection area redundant between the adjacent radar sensors' i) Case in which the object detection probability is the lowest: an 'area where an object is located at a long distance and the antenna gain is low, a 'detection area which is not repeated in each frame', and a 'detection area which is not redundant between the adjacent radar sensors'

It may be unreasonable to set the same threshold value to all the grids, in order to decide whether a stationary object occupies each of the grids within the grid map, in the two above cases. That is because, in case (i), it may be falsely determined that an object is present, even though no object is actually present (false detection), and in case (ii), it may be falsely determined that no object is present, even though an object is actually present (missing detection). Thus, in the present embodiment, the threshold values for the respective grids may be differently set depending on the object detection probability, which makes it possible to prevent the false determination (false detection and missing detection).

Specifically, the threshold value may be set to different values for an independent area, a single-overlap area, and a multi-overlap area within the grid map.

Figure 5:
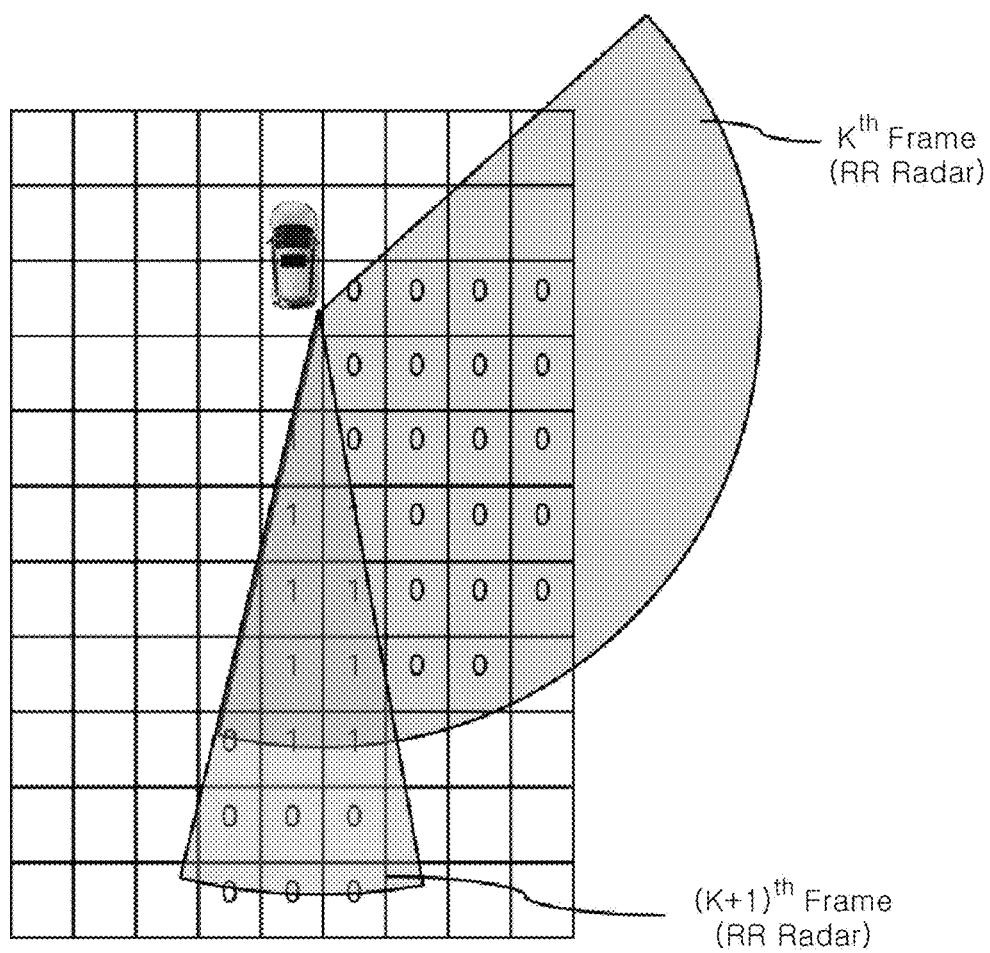

The independent area may be defined as an area within the grid map, which is sensed by the first detection sensor 110 in a $K^{th}$ frame, where K is a natural number, and the single-overlap area may be defined as an area within the grid map, in which an independent area and an area sensed by the first detection sensor 110 overlap each other in a $(K+1)^{th}$ frame distinguished from the $K^{th}$ frame (following the $K^{th}$ frame). That is, the independent area and the single-overlap area are distinguished from each other, according to whether the detection areas overlap each other for the same detection sensor in the respective frames. In FIG. 5 in which the first detection sensor is the RR radar, the grid of the independent area is designated by '0', and the grid of the single-overlap area is designated by '1'. The threshold value of the grid of the independent area may be set to a lower value than that of the grid of the single-overlap area, which makes it possible to compensate for false detection and missing detection which may occur for an object located in the independent area.

Figure 6:
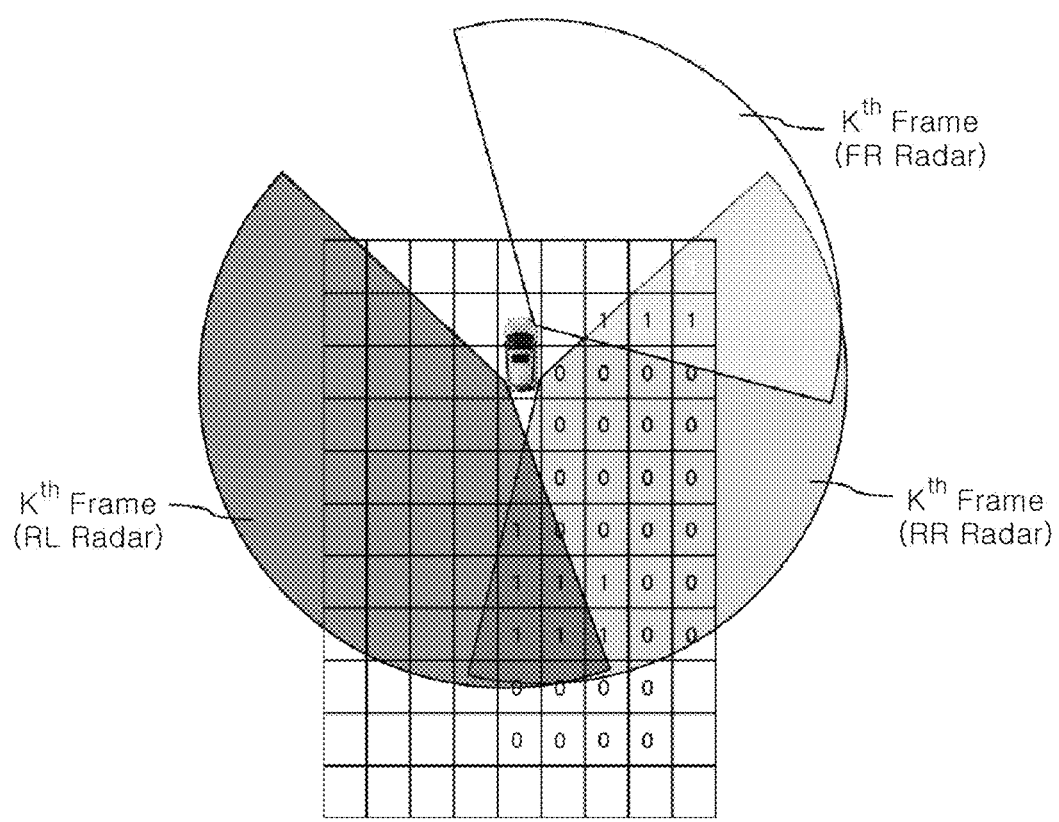

The multi-overlap area may be defined as an area within the grid map, in which an area sensed by the second detection sensor 120 adjacent to the first detection sensor 110 overlaps a single-overlap area in the same frame ($K^{th}$ or $(K+1)^{th}$ frame). That is, the multi-overlap area is decided according to whether areas detected by two adjacent detection sensors overlap each other in the same frame. In FIG. 6 in which the first detection sensor is the RR radar and the second detection sensor is the RL radar, the grid of an area sensed by the first detection sensor 110 is designated by '0', and the grid of the area where areas sensed by the first and second detection sensors 110 and 120 overlap each other is designated by '1'. Thus, as illustrated in FIG. 7 in which the first detection sensor is the RR radar and the second detection sensor is the RL radar, the grid map may be divided into the independent area '0' sensed by the first detection sensor 110 in the $K^{th}$ frame, the single-overlap area '1' which is an overlap area between the areas sensed by the first detection sensor 110 in the $K^{th}$ frame and the $(K+1)^{th}$ frame, and the multi-overlap area '2' which is an overlap area sensed by the first and second detection sensors 110 and 120 in the same frame and overlaps the single-overlap area. When the threshold values of the independent area, the single-overlap area, and the multi-overlap area are defined as a first threshold value, a second threshold value, and a third threshold value, respectively, a relationship of 'first threshold value<second threshold value<third threshold value' may be established in a section where the threshold values linearly increase as illustrated in FIG. 8.

2-2. Grid Map Update

As described above, since the longitudinal axis, horizontal index, and indexes of the grid map are set on the basis of the vehicle, the indexes of the grid map are changed by the behavior of the vehicle. Thus, a process of updating the grid map by changing the indexes of the grid map is needed in order to map a stationary object to the grid map. Furthermore, even after the stationary object is mapped to the grid map, the index of the grid to which the stationary object is mapped needs to be changed according to the behavior of the vehicle. When the grid map is updated after the stationary object is mapped to the grid map, the index of the grid to which the stationary object is mapped is also changed.

For this operation, the control unit 200 may update the grid map when a longitudinal moving distance of the vehicle is larger than the longitudinal size of the grid or a horizontal moving distance of the vehicle is larger than the horizontal size of the grid during a period from a $(K-1)^{th}$ frame to the $K^{th}$ frame. In this case, the control unit 200 may change the indexes of the respective grids in the $(K-1)^{th}$ frame from those in the $K^{th}$ frame, on the basis of the longitudinal moving distance, the horizontal moving distance, and a longitudinal angle change of the vehicle.

In order to take, as an example of a changed index, the index of a grid at which a stationary object is located, FIG. 9A illustrates the grid map in the $(K-1)^{th}$ frame with the index of the grid at which the stationary object is located. When the vehicle travels in the longitudinal direction by a distance larger than the longitudinal size of the grid as illustrated in FIG. 9B, the index of the stationary index on the grid map in the $(K-1)^{th}$ frame needs to be changed on the basis of the $K^{th}$ frame, because the index of the stationary object on the grid map in the $K^{th}$ frame is different from the index of the stationary object on the grid map in the $(K-1)^{th}$ frame. When the vehicle makes a turn according to a predetermined yaw rate as illustrated in FIG. 9C such that the longitudinal or horizontal moving distance of the vehicle becomes smaller than the longitudinal or horizontal size of the grid, the index of the stationary object on the grid map in the $(K-1)^{th}$ frame needs to be changed on the basis of the $K^{th}$ frame, because the index of the stationary object on the grid map in the $K^{th}$ frame is different from the index of the stationary object on the grid map in the $(K-1)^{th}$ frame. In this case, an angle change based on the yaw rate may be reflected into the update of the grid map.

The update process for the grid map based on FIGS. 9A to 9C will be described with reference to modeling of FIG. 10.

First, the control unit 200 calculates the accumulative values of yaw-axis angle changes and moving displacement changes of the vehicle during a period from the $(K-1)^{th}$ frame to the $K^{th}$ frame, according to Equation 1 below.

$$-\Delta\theta\_acc = \Delta\theta\_acc + \Delta\theta - \Delta\gamma = Vs*dt = |\Delta\gamma|\cdot\cos(\Delta\theta)\hat{a}_x + |\Delta\gamma|\cdot\sin(\Delta\theta)\hat{a}_y, -\Delta\gamma\_acc = \Delta\gamma\_acc + \Delta\gamma \quad \text{[Equation 1]}$$

In Equation 1, $\Delta\theta$ represents a yaw-axis reference instantaneous angle change of the vehicle, $\Delta\theta\_acc$ represents a yaw-axis reference accumulative angle change during the period from the $(K-1)^{th}$ frame to the $K^{th}$ frame, $\Delta\gamma$ represents an instantaneous moving displacement of the vehicle, Vs represents the speed of the vehicle, dt represents a time period from the $(K-1)^{th}$ frame to the $K^{th}$ frame, represents a longitudinal unit vector, represents a horizontal unit vector, and $\Delta\gamma\_acc$ represents an accumulative moving displacement of the vehicle during the period from the $(K-1)^{th}$ frame to the $K^{th}$ frame.

The control unit 200 determines whether a grid map update condition is satisfied, according to Equation 2 below.

$$\Delta x_k = -\Delta\gamma \cdot \cos(\Delta\theta)$$

$$\Delta y_k = \Delta\gamma \cdot \sin(\Delta\theta)$$

$$\Delta x_k\_acc = \Delta x_k\_acc + \Delta x_k$$

$$\Delta y_k\_acc = \Delta y_k\_acc + \Delta y_k$$

$$\text{if}(|\Delta x_{k_{acc}}| > X_{map\_step}) \| (|\Delta y_{k_{acc}}| > Y_{map\_step}) \quad \text{[Equation 2]}$$

In Equation 2, $\Delta x_k$ represents a longitudinal instantaneous moving distance of the vehicle, $\Delta y_k$ represents a horizontal instantaneous moving distance of the vehicle, $\Delta x_k\_acc$ represents a longitudinal accumulative moving distance of the vehicle, and $\Delta y_k\_acc$ represents a horizontal accumulative moving distance of the vehicle.

When the grid map update condition is satisfied according to Equation 2, the control unit 200 updates the grid map according to Equation 3 below.

$$\begin{bmatrix} X_{map\_update}(i) \\ Y_{map\_update}(j) \end{bmatrix} = \quad \text{[Equation 3]}$$

$$\begin{bmatrix} \cos(\Delta\theta_k) & \sin(\Delta\theta_k) \\ -\sin(\Delta\theta_k) & \cos(\Delta\theta_k) \end{bmatrix} \cdot \begin{bmatrix} X_{map}(i) \\ Y_{map}(j) \end{bmatrix} + \begin{bmatrix} \Delta x_k\_acc \\ \Delta y_k\_acc \end{bmatrix}$$

$$i\_update = \text{floor}\left(\frac{X_{map\_update}(i) - X_{map\_min}}{X_{map\_step}}\right) + 1$$

$$j\_update = \text{floor}\left(\frac{Y_{map_{update}}(j) - Y_{map\_min}}{Y_{map\_step}}\right) + 1$$

In Equation 3, (i, i) represents the index of a grid, (i_update, j_update) represents the index of an updated grid, and floor represents a truncation operator. In Equation 3, the matrix functions as a rotation matrix for rotating the grid map according to the yaw rate of the vehicle:

2-3. Stationary Object Mapping

The control unit 200 may convert the location information of a stationary object, i.e. the longitudinal distance and horizontal distance to the stationary object, into an index corresponding to the (updated) grid map, according to Equation 4 below.

$$I_{tgt\_n} = \text{floor}\left(\frac{X_{tgt\_n} - X_{map\_min}}{X_{map\_step}}\right) + 1 \quad \text{[Equation 4]}$$

$$J_{tgt\_n} = \text{floor}\left(\frac{Y_{tgt\_n} - Y_{map\_min}}{Y_{map\_step}}\right) + 1$$

In Equation 4, $I_{tgt\_n}$ represents the longitudinal index of a target grid, $J_{tgt\_n}$ represents the horizontal index of the target grid, $X_{tgt\_n}$ represents the longitudinal distance to the stationary object, and $Y_{tgt\_n}$ represents the horizontal distance to the stationary object.

As illustrated in FIG. 11, the control unit 200 may map an extracted stationary object to the grid map by specifying a target grid of the grid map, corresponding to a changed index. In this case, the control unit 200 may add occupancy information having a first value to the target grid to which the stationary object is mapped, and add occupancy information having a second value to the other grids. In the present embodiment, the first value may be set to '1', and the second value may be set to '0'. Thus, the value '1' may be added as the occupancy information to the target grid to which the stationary object is mapped, and the value '0' may be added as the occupancy information to the other grids to which the stationary object is not mapped. Hereafter, the occupancy information added to an index (i, j) in the $K^{th}$ frame will be represented by Pmap (i, j, k).

3. Expanded Mapping Area Decision

As described above, the waveform, frequency, distance resolution, angle resolution, maximum sensing distance, and FoV of a radar signal transmitted from a radar sensor may have different characteristics for the respective frames, depending on the DAS (e.g. BSD, LCA or ROTA) of the vehicle, to which the radar sensor is applied. Therefore, although the same stationary object is detected, the index at which the stationary object is detected may be changed in each frame because the signal characteristics are different in each frame. In this case, an occupancy probability parameter to be described below may be reduced by the number of used signal waveforms. FIG. 12 illustrates results obtained when the radar sensor detects the same stationary object by transmitting radar signals with a single waveform and multiple waveforms. In the case of the multiple waveforms, grids occupied in the respective frames are distributed to reduce the probability that the stationary object will be detected, compared to the single waveform. When the threshold value of the grid map is set to a low value to compensate for the reduction in the occupancy probability parameter, the stationary object is highly likely to be falsely detected due to a clutter or noise.

In order to prevent the false detection, the control unit 200 in accordance with the present embodiment may add occupancy information to surrounding grids as well as the target grid corresponding to the detected stationary object. Specifically, as illustrated in FIG. 13, the control unit 200 may decide an expanded mapping area, which is expanded by a preset range on the basis of the target grid to which the stationary object is mapped, and calculate the occupancy probability parameter by adding the occupancy information with the first value to each of the grids constituting the expanded mapping area, in order to monitor the surrounding environment of the vehicle. The preset range expanded from the target grid may be defined in advance by a designer, in consideration of the similarity (distance resolution and speed resolution) between the signal waveforms.

FIG. 14 illustrates results obtained when the radar sensor detects the same stationary object by transmitting radar signals with a single waveform and multiple waveforms. After the expanded mapping area expanded by the present range from the target grid is set, the reduction in the probability that the stationary object will be detected may be removed even in the case of the multiple waveforms, through the following method of calculating the occupancy probability parameter for each of the grids constituting the expanded mapping area.

4. Occupancy Probability Parameter Calculation

The process of calculating the occupancy probability parameter of the grid map in the present embodiment follows an occupancy probability calculation method of a general OGM (Occupancy Grid Map) based on Equation 5 below.

$$l_t(i,j \mid R_{1:k}, V_{1:k}) = \log\frac{p(i,j \mid R_{1:k}, V_{1:k})}{1 - p(i,j \mid R_{1:k}, V_{1:k})} \text{ Log odd ratio} \quad \text{[Equation 5]}$$

$$l_t(i,j \mid R_{1:k}, V_{1:k}) =$$

$$l_{t-1}(i,j \mid R_{1:k-1}, V_{1:k-1}) + \log\frac{p(i,j \mid R_k, V_k)}{1 - p(i,j \mid R_k, V_k)} - l_0$$

$$p(i,j \mid R_{1:k}, V_{1:k}) = 1 - \frac{1}{1 + \exp(l_t(i,j \mid R_{1:k}, V_{1:k}))}$$

In Equation 5, k represents the sensing data (the above-described object information) of the sensor unit 100 (radar sensor) from the first frame to the $K^{th}$ frame, and $V_{1:k}$ represents the behavior data (the above-described behavior information) of the vehicle from the first frame to the $K^{th}$ frame, and I0 represents a prior probability (0 in the present embodiment).

When the occupancy information Pmap (i, j, k) added to each of the grids in the present embodiment is applied to the occupancy probability calculation method based on Equation 5 above, an occupancy probability parameter p is calculated according to Equation 6 below.

$$p(i,j \mid R_{1:k}, V_{1:k}) = \frac{1}{M}\sum_{m=k-M+1}^{k} P_{map}(i,j,m) \quad \text{[Equation 6]}$$

In Equation 6, M represents the number of frames to be monitored.

5. Grid Map Update Error Correction

The speed, moving displacement, and yaw-axis angle change of the vehicle, which serve as factors for determining whether the update condition of the grid map is satisfied, are acquired by the sensors applied to the vehicle. Since such sensing values inevitably contain an error, it may be determined that the update condition of the grid map has been satisfied even though the update condition of the grid map was not actually satisfied, due to the error contained in the sensing values. In this case, the grid map may be falsely updated. As described above, during the update process for the grid map, the control unit 200 operates to change the index of the target grid to which the stationary object is mapped. Thus, when the grid map is falsely updated, an error may occur between the index corresponding to the actual location of the stationary object and the index of the stationary object mapped to the falsely updated grid map. As a result, the error may cause false detection and missing detection for the stationary object.

The occurrence of the error will be described with reference to FIGS. 15A to 15D. FIG. 15A illustrates that a stationary object is mapped to a grid $\hat{1}$ in the $(K-1)^{th}$ frame, and then the grid ① is expanded by a preset range to decide a first expanded mapping area, and FIG. 15B illustrates that the update condition of the above-described grid map is satisfied in the $K^{th}$ frame, such that the grid map is updated. Since the grid map has been updated, the index of the grid to which the stationary object is mapped is also changed, so that the grid to which the stationary object is mapped is updated into a grid 0. Furthermore, the location of the stationary object, which has been actually detected by the sensor unit 100, is still maintained at the grid ①. As a result, an error occurs between the index of the grid corresponding to the actual location of the stationary object and the index of the grid of the stationary object mapped to the updated grid map.

When the grid map is updated as the $(K-1)^{th}$ frame is switched to the $K^{th}$ frame, the control unit 200 may correct the respective occupancy probability parameters of the grids constituting a second expanded mapping area through a method of comparing the first expanded mapping area in the $(K-1)^{th}$ frame to the second expanded mapping area in the $K^{th}$ frame, thereby correcting the above-described update error.

Referring to FIG. 15C, the control unit 200 may specify a first area composed of grids whose occupancy probability parameters have increased, among the grids of the second expanded mapping area, on the basis of the $K^{th}$ frame over the $(K-1)^{th}$ frame. That is, the first area corresponds to grids which were not occupied in the $(K-1)^{th}$ frame, but are occupied in the $K^{th}$ frame. Furthermore, the control unit 200 may specify a second area composed of grids whose occupancy probability parameters have decreased, among the grids of the first expanded mapping area, on the basis of the $K^{th}$ frame over the $(K-1)^{th}$ frame. That is, the second area corresponds to grids which were occupied in the $(K-1)^{th}$ frame, but are not occupied in the $K^{th}$ frame. Furthermore, the control unit 200 may correct the respective occupancy probability parameters of the grids constituting the second expanded mapping area in the $K^{th}$ frame by substituting the occupancy probability parameters of the second area with the occupancy probability parameters of the first area. Thus, as illustrated in FIG. 15D, the expanded mapping area may be configured while being matched with the location of the stationary object, which is actually detected by the sensor unit 100. When the state in which the grids constituting the second area are not occupied lasts for a preset time, the occupancy probability parameters of the grids may be reset to '0'.

FIG. 16A illustrates an example of an occupancy probability parameter on the grid map before an update error of the grid map is updated. As described in FIG. 16A, a grid ① corresponds to a location having horizontal/longitudinal errors from the actual location of a stationary object, but remains with a predetermined occupancy probability value, and a grid ② corresponds to the actual location of the stationary object, but has a lower occupancy probability value than surrounding grids, because the grid ② is a newly occupied grid.

FIG. 16B illustrates an example of the occupancy probability parameter on the grid map after an update error of the grid map is corrected. As described in FIG. 16B, a grid ① is a previously occupied grid, and has a low occupancy probability value through resetting, and a grid ② corresponds to the actual location of a stationary object, and has a higher occupancy probability value than surrounding grids because the grid ② is a newly occupied grid, but inherits a predetermined occupancy probability value.

6. Correction for Shaded Area

Figure 17:
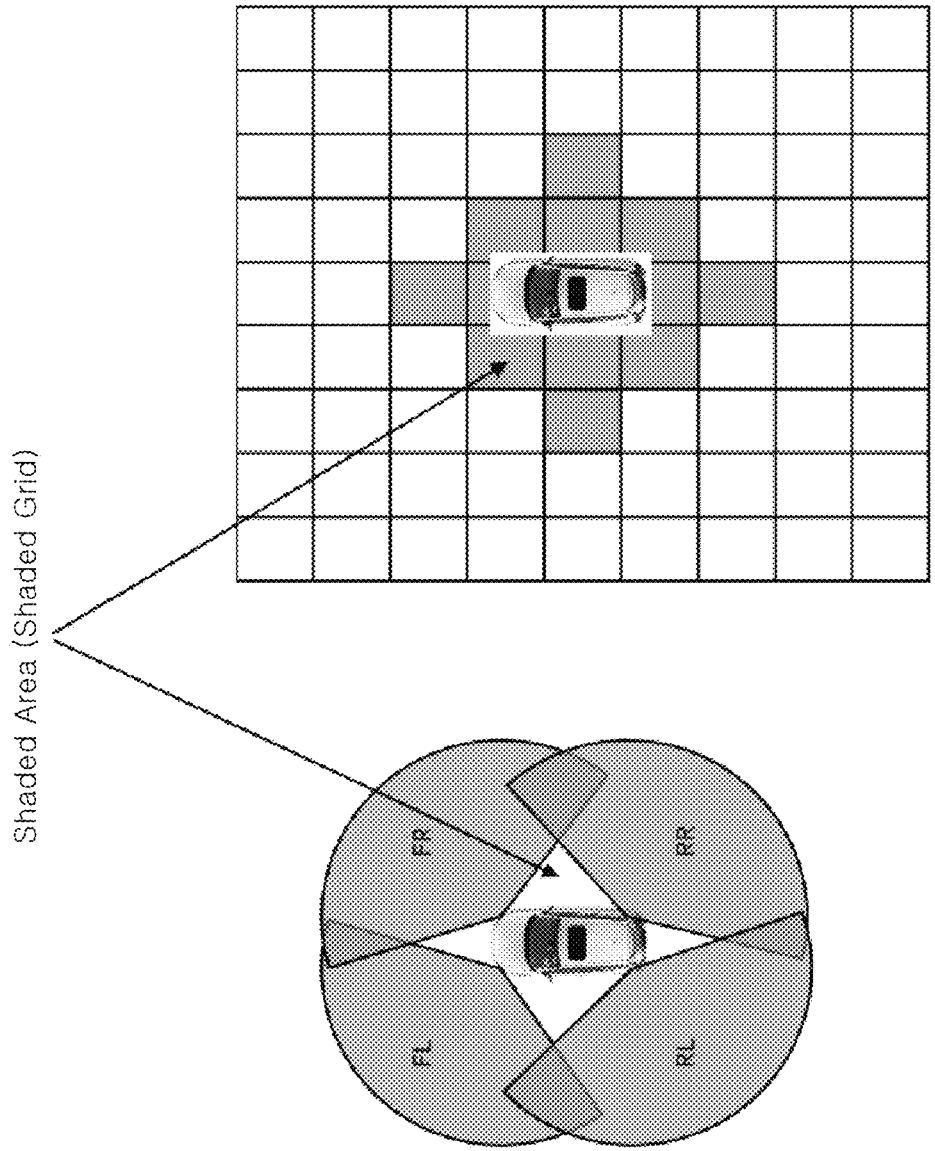

As described above, the detection sensor in accordance with the present embodiment may be implemented as a radar sensor. As illustrated in FIG. 17, a shaded area where the radar sensor cannot detect an outside object occurs due to the FoV and mounting characteristics (mounting angle and position) of the radar sensor.

In order to correct a shaded grid corresponding to the shaded area, the control unit 200 may operate to correct the shaded grid by using a first method of receiving an occupancy probability parameter in the $(K-1)^{th}$ frame or a second method of receiving an occupancy probability parameter of a grid around the shaded grid.

Figure 18:
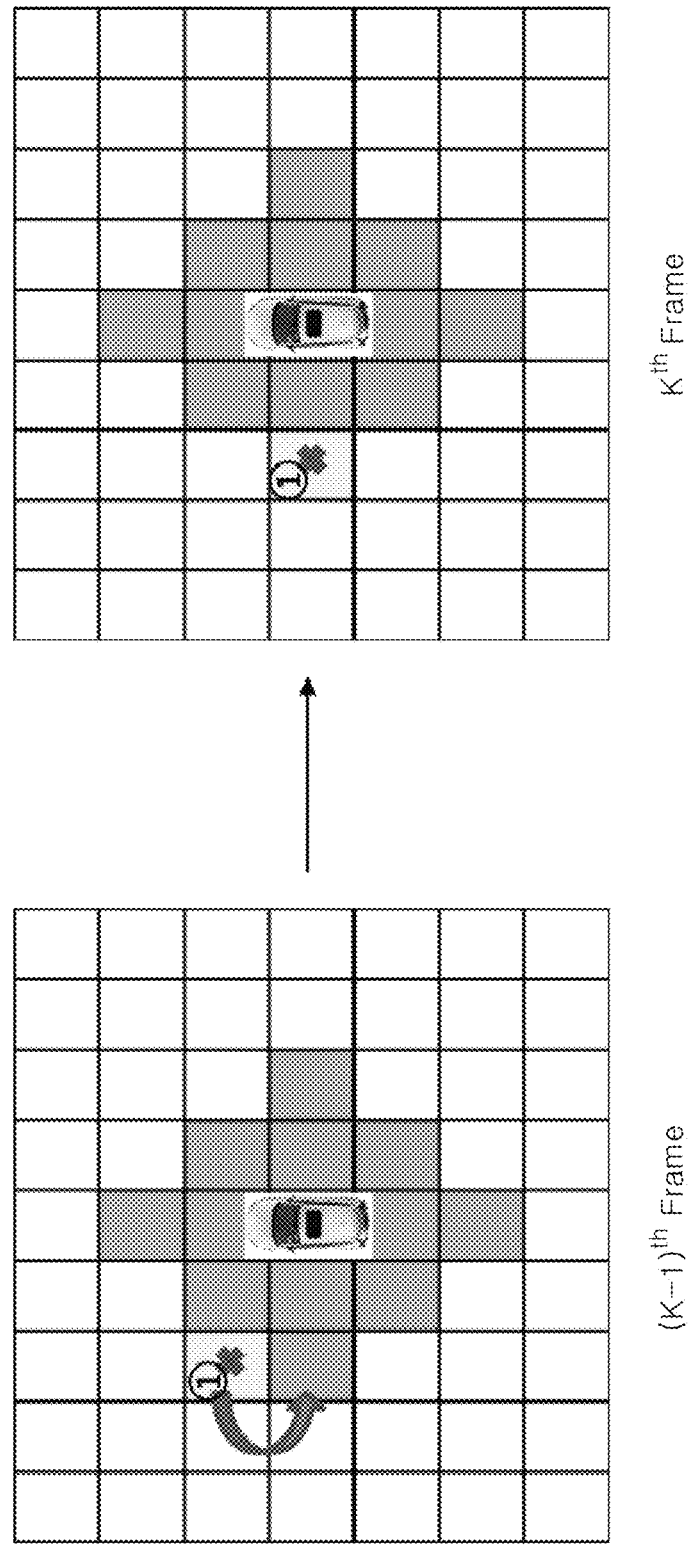

The first method may be performed when the speed of the vehicle is equal to or higher than a preset reference value. As illustrated in FIG. 18, a grid ① in the $(K-1)^{th}$ frame does not correspond to a shaded grid, and thus retains with an occupancy probability parameter. When the vehicle speed is equal to or higher than the reference value, the update process for the grid map is performed, and the grid ① in the $K^{th}$ frame belongs to the shaded grids. In this case, the control unit 200 may set the occupancy probability parameter of the grid ① in the $(K-1)^{th}$ frame to the occupancy probability parameter of the shaded grid ① in the $K^{th}$ frame, thereby minimizing a loss caused by missing detection of the radar sensor.

Figure 19:
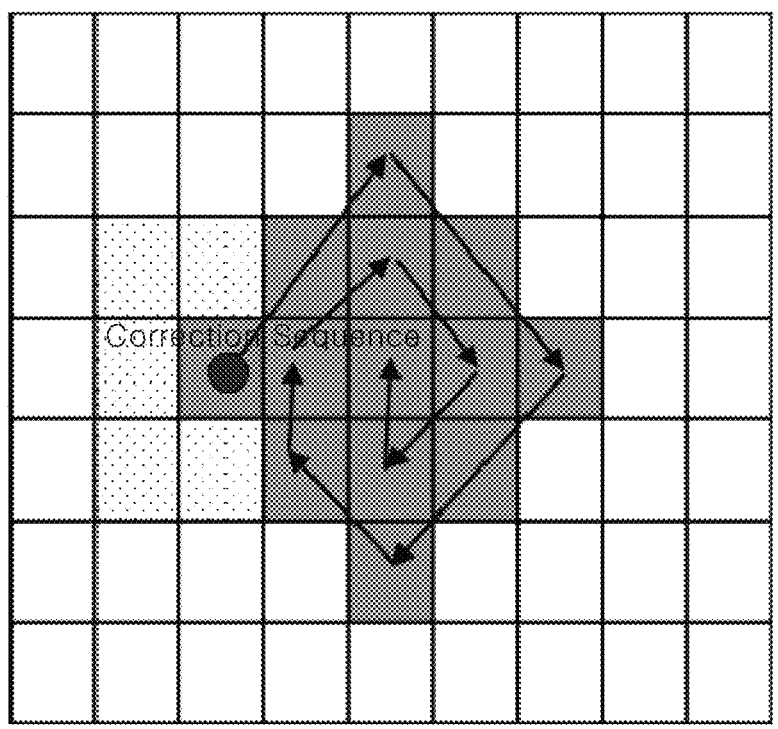

The second method may be performed when the speed of the vehicle is lower than the reference value. That is, when the vehicle travels at a very low speed or is stopped, the grid map is not updated even though the $(K-1)^{th}$ frame is switched to the $K^{th}$ frame. Thus, the first method cannot be applied. In this case, the control unit 200 may operate to set the occupancy probability parameter of a grid around a shaded grid to the occupancy probability parameter of the shaded grid. In this case, as illustrated in FIG. 19, the control unit 200 may perform the second method from a shaded grid located at the outermost position, in order to acquire the occupancy probability parameter of a grid which is not the shaded grid. The control unit 200 may set the highest occupancy probability parameter, among the occupancy probability parameters of grids located within a preset range (e.g. one grid) from the shaded grid, to the occupancy probability parameter of the corresponding shaded grid. FIGS. 20A and 20B show a result obtained by setting an occupancy probability parameter with a predetermined value to a shaded grid through the correction for the shaded area.

7. Stationary Object Location Decision (Peak Detection)

When the update of the grid map, the decision of the expanded mapping area, the update error correction, and the shaded area correction are performed through the above-described processes, the control unit 200 may operate to specify the grid at which the stationary object is highly likely to be located, on the basis of the occupancy probability parameters of the grids within the expanded mapping area.

That is, the control unit 200 may decide a peak grid having the highest occupancy probability parameter among the grids within the expanded mapping area decided for a plurality of frames to be monitored. When the occupancy probability parameter of the peak grid is equal to or larger than a threshold value defined for the peak grid, the control unit 200 may determine that the stationary object is located at the peak grid. The control unit 200 may monitor the surrounding environment of the vehicle by repeatedly performing the stationary object location decision method based on the 'peak detection', while the vehicle travels. The peak grid on which the stationary object is determined to be located may consist of a plurality of peak grids in relation to the driving of the vehicle. In the present embodiment, if the grid corresponding to the index (i,j) corresponds to the peak grid, it is marked with a notation of "Dmap(i,j)=1", and if the grid corresponding to the index (i,j) does not correspond to the peak grid, it is marked with a notation of "Dmap(i,j)=0".

8. Continuous Structure Monitoring

The plurality of peak grids determined as described above may be clustered according to whether they have the same characteristic (i.e., whether they correspond to the same physical structure). When the edge grids of the clusters formed accordingly are continuously arranged, those grids may be determined as grids on which continuous structures around the vehicle are located. The determined continuous structures may correspond to other vehicles, guardrails, or the like parked continuously in the parking lot. Accordingly, the control unit 200 may cause the vehicle to park or travel by avoiding the continuous structure therearound. This continuous structure monitoring process may be divided into a cluster creation process and an edge grid extraction process.

Figure 21:
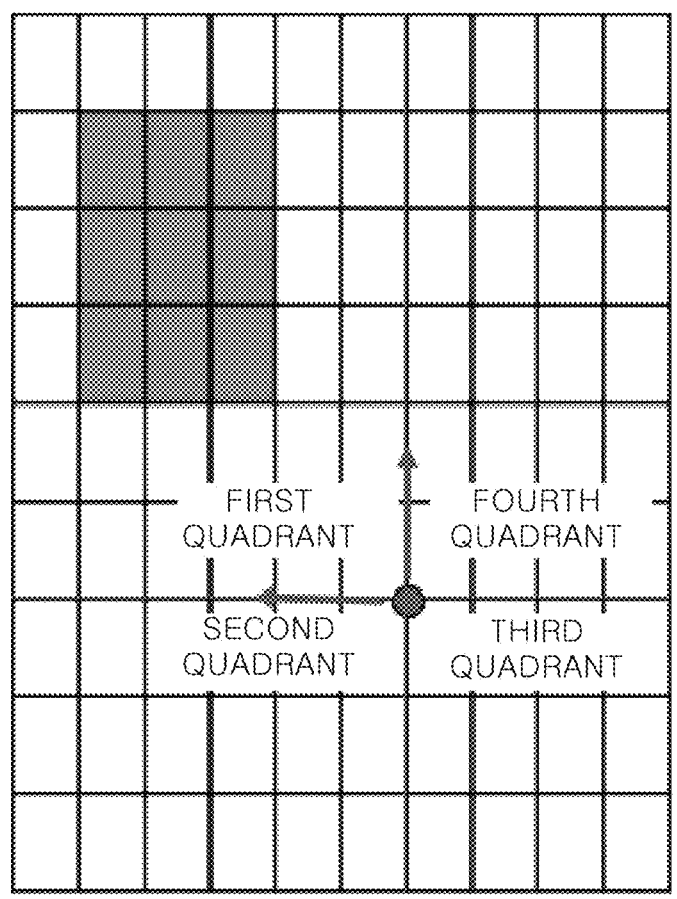
FIGS. 21 to 26 are diagrams illustrating a process of monitoring a continuous structure in the apparatus for monitoring the surrounding environment of a vehicle in accordance with the embodiment of the present disclosure.

First of all, the cluster creation process will be described. A predefined clustering algorithm may be applied to the peak grid specified in the process of "7. Stationary Object Location Decision (Peak Detection)" to create one or more clusters composed of a plurality of grids having the same characteristic. The clustering algorithm may correspond to a density based spatial clustering of applications with noise (DBSCAN) algorithm. As is well known, the DBSCAN algorithm is an algorithm that clusters a high-density part where points are concentrated, which is known as a strong model for noise and outlier identification. In the present embodiment, the distance between the peak grids where stationary objects are located is applied as the clustering criterion of the DBSCAN algorithm. That is, the cluster is composed of a set of peak grids where the distance between the peak grids is less than or equal to the reference value or they are immediately adjacent to each other. FIG. 21 illustrates an example of the created cluster.

Thereafter, the control unit 200 may operate to extract the edge grid of each cluster and to monitor continuous structures around the vehicle. Specifically, the control unit 200 may monitor the continuous structures around the vehicle by determining the edge grid of each cluster and a nearest edge grid extracted therefrom.

First, in the process of extracting the edge grid of the cluster, when a peak grid (Dmap(i,j)=1) does not exist in any of immediately adjacent grids among the grids constituting the cluster, the control unit 200 may extract that grid as the edge grid of the cluster.

Figure 22A:
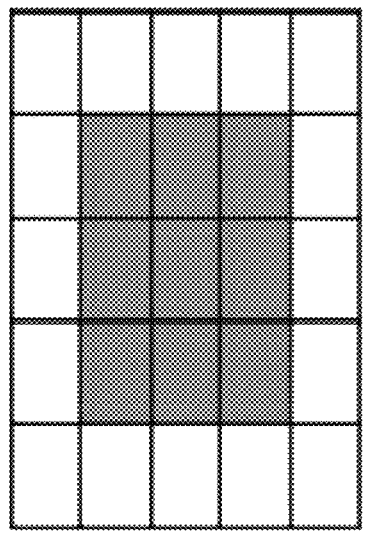

FIG. 22 illustrates an example of extracting the edge grid of the cluster. FIG. 22(a) illustrates grids constituting the cluster, wherein it is determined whether a peak grid present in a grid immediately adjacent to that grid using Equation 7 below.

$$EdgeFlag(i, j) = \begin{cases} 1, \text{ if } \left( \sum_{k=i-1}^{i+1} \sum_{r=j-1}^{j+1} D_{map}(k, r) < 9 \right) \\ 0, \text{ else} \end{cases} \quad \text{[Equation 7]}$$

Figure 22B:
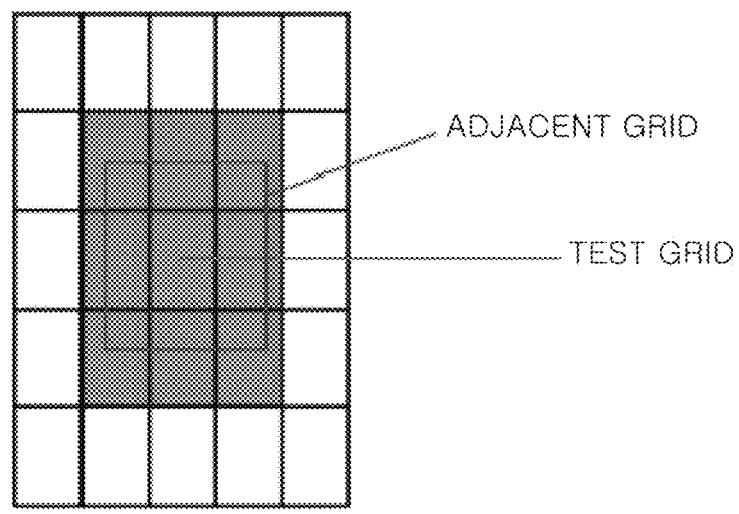
Figure 22C:
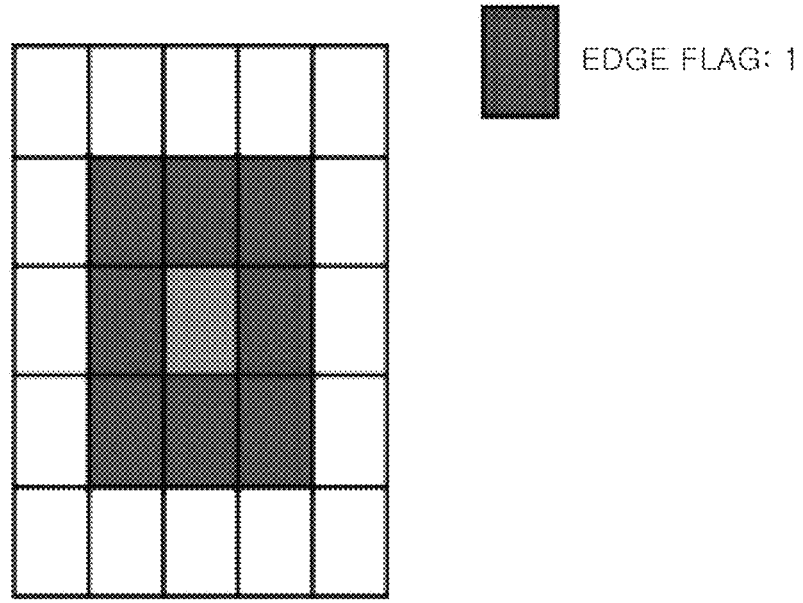

Referring to FIG. 22(b), in a "test grid", since all the immediately adjacent grids correspond to peak grids, the edge flag is set to a value of 0 in Equation 7, and in an "adjacent grid", since at least one of the immediately adjacent grids does not correspond to a peak grid, the edge flag is set to a value of 1 in Equation 7. As a result, an edge grid in which the edge flag is set to a value of 1 may be extracted as illustrated in FIG. 22(c). The edge flag extraction process in FIG. 22 and Equation 7 is performed to secure memory resources and reduce the amount of computation and computational complexity in the process of determining a nearest edge flag to be described later.

When the edge grid of the cluster is extracted, the control unit 200 may determine a nearest edge grid, which is at a position closest to the vehicle, from among the extracted edge grids. As described above, the longitudinal axis, transverse axis, and index of the grid map are set with respect to the vehicle. Accordingly, the grid map may be divided into first to fourth quadrants with respect to the vehicle as illustrated in FIG. 21. The positions of the first to fourth quadrants are the same as the positions of the quadrants in the normal X-Y coordinate system.

In the process of determining the nearest edge grid of the cluster, the control unit 200 may operate to determine the nearest edge grid of that cluster in a variable manner depending on a quadrant in which that cluster exists among the first to fourth quadrants.

Figure 23:
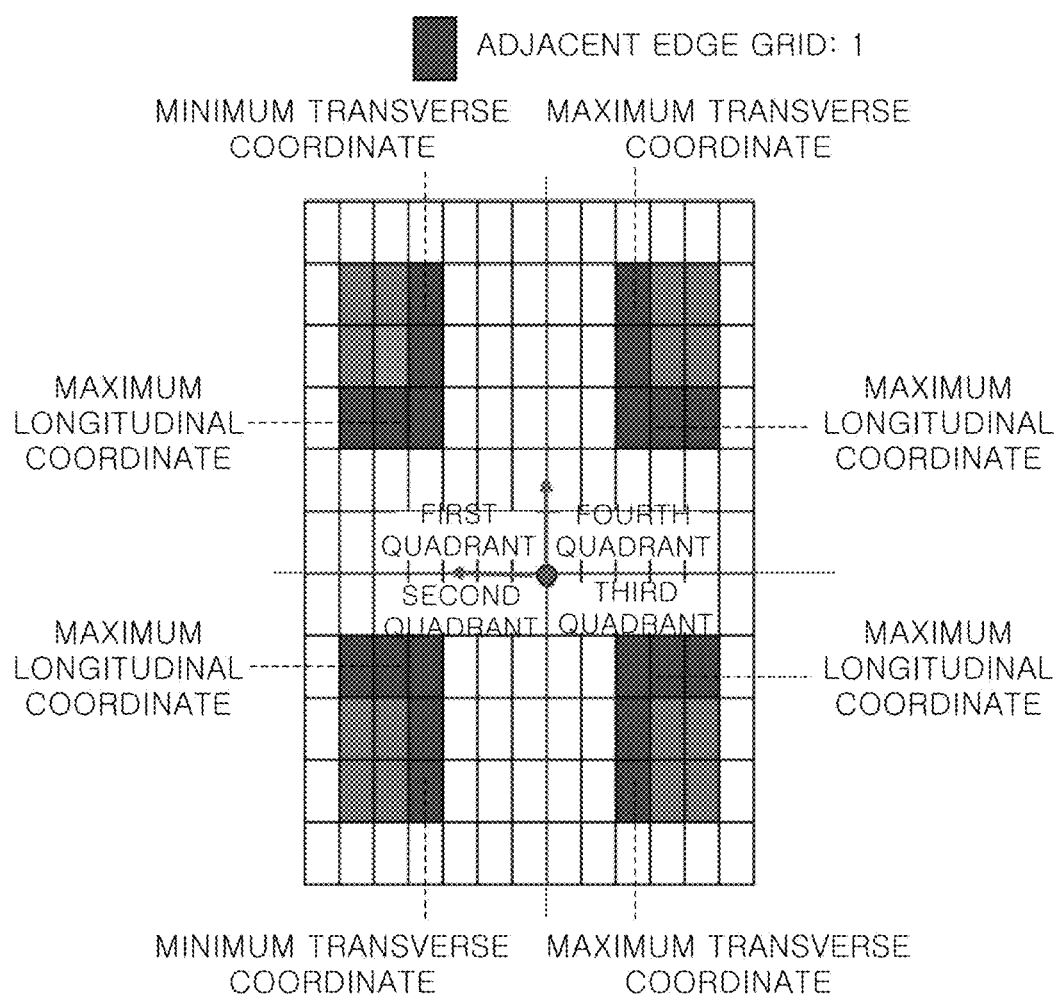

Specifically, as illustrated in FIG. 23, the control unit 200 may, i) when a cluster exists in the first quadrant, determine, as a nearest edge grid, a grid with minimum longitudinal and minimum transverse coordinates of the index among the edge grids of that cluster, ii) when a cluster exists in the second quadrant, determine, as a nearest edge grid, a grid with maximum longitudinal and minimum transverse coordinates of the index among the edge grids of that cluster, iii) when a cluster exists in the third quadrant, determine, as a nearest edge grid, a grid with maximum longitudinal and maximum transverse coordinates of the index among the edge grids of that cluster, and iv) when a cluster exists in the fourth quadrant, determine, as a nearest edge grid, a grid with minimum longitudinal and maximum transverse coordinates of the index among the edge grids of that cluster.

Figure 24:
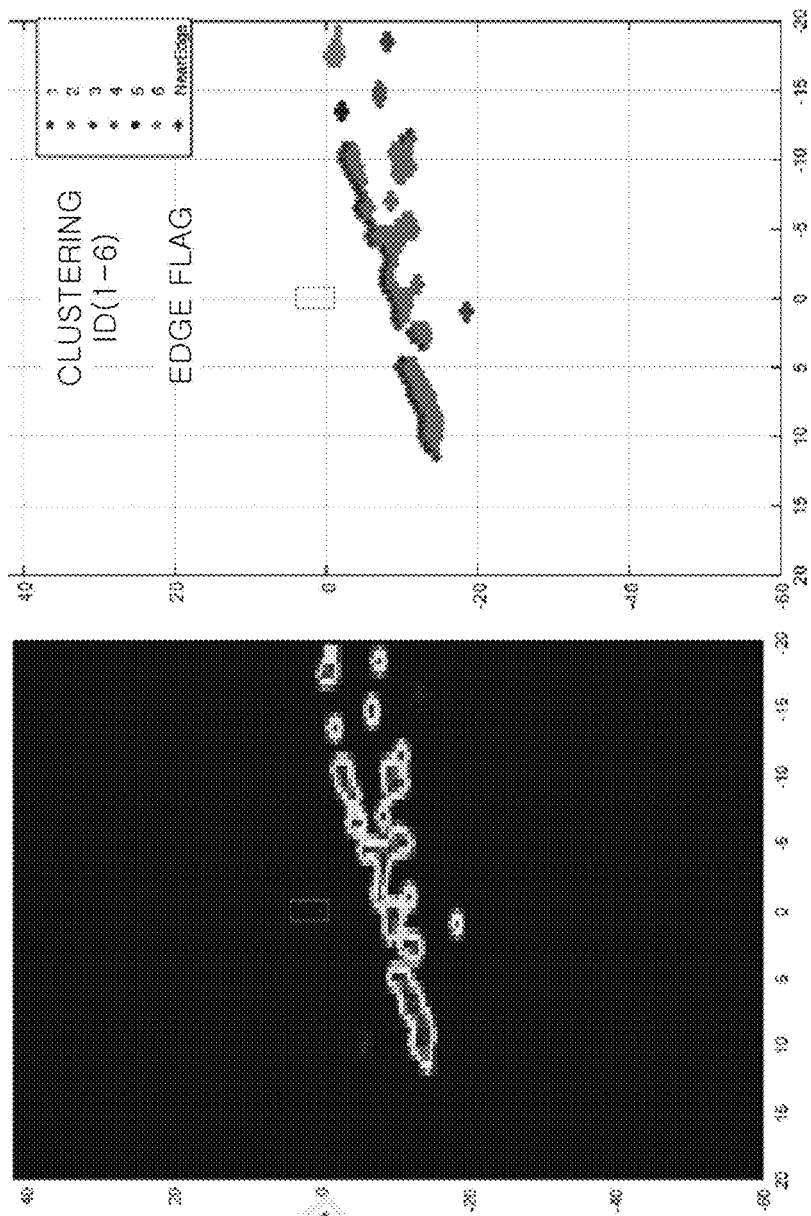
Figure 25:
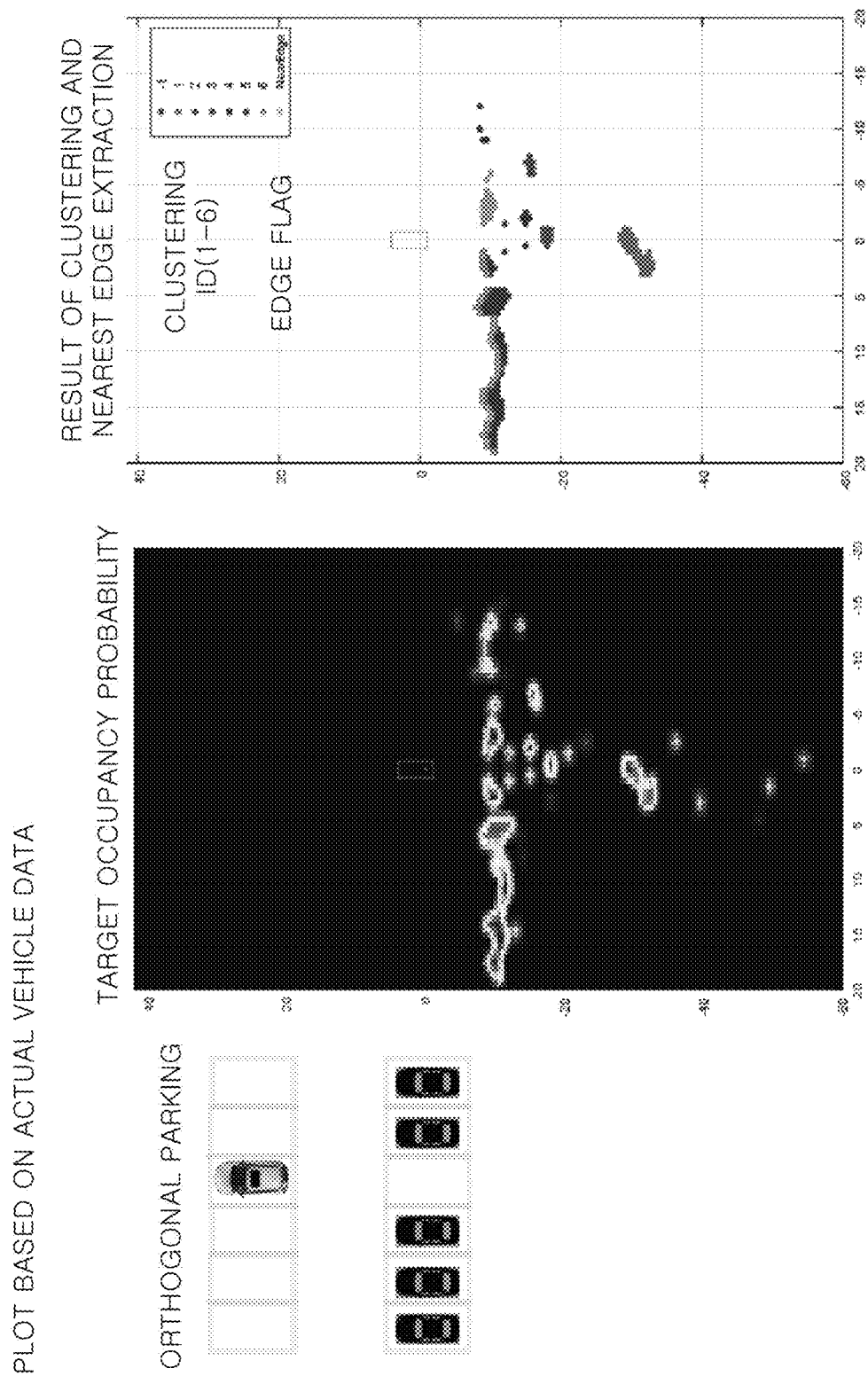
Figure 26:
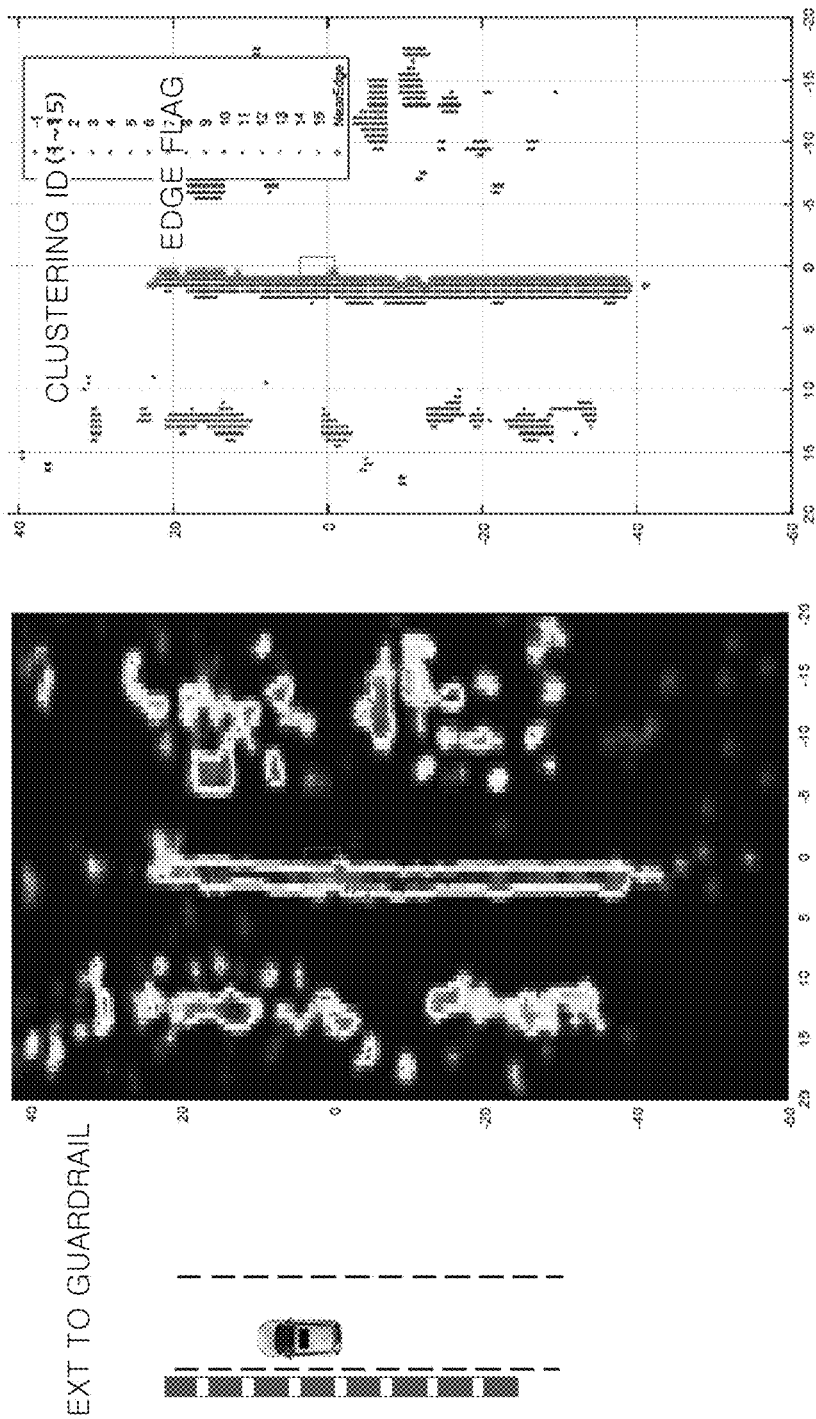

When the nearest edge grids of the cluster are determined and the determined nearest edge grids are continuously arranged, the control unit 200 may determine those nearest edge grids as grids on which continuous structures around the vehicle are located. FIG. 24 illustrates a result of cluster and nearest edge grid extraction when other vehicles parked continuously in a diagonal pattern exist around the vehicle. FIG. 25 illustrates a result of cluster and nearest edge grid extraction when other vehicles parked continuously in an orthogonal pattern exist around the vehicle. FIG. 26 illustrates a result of cluster and nearest edge grid extraction when a guardrail exists around the vehicle. Accordingly, the control unit 200 may cause the vehicle to park or travel by avoiding the continuous structure therearound.

9. ROTA Function Control

As described above, the vehicle radar system may be utilized for a rear cross traffic alert (ROTA) system. The ROTA system operates to determine distance movement information between frames to estimate a speed of a target vehicle moving in the parking space. However, the ROTA system may affect the detection performance of the target vehicle approaching to the vehicle when many other vehicles are parked around the vehicle. Moreover, it is difficult to extract a detection result accurately related to the target vehicle from various object detection results since the object detection results are obtained in large quantities from a plurality of parked vehicles as well as the target vehicle. Hence, the longitudinal and transverse speed detection performance of the target vehicle and thus the accuracy of the approach angle thereof are reduced, which in turn causes ROTA non-warning, false warning, warning delay, and so on.

Figure 27:
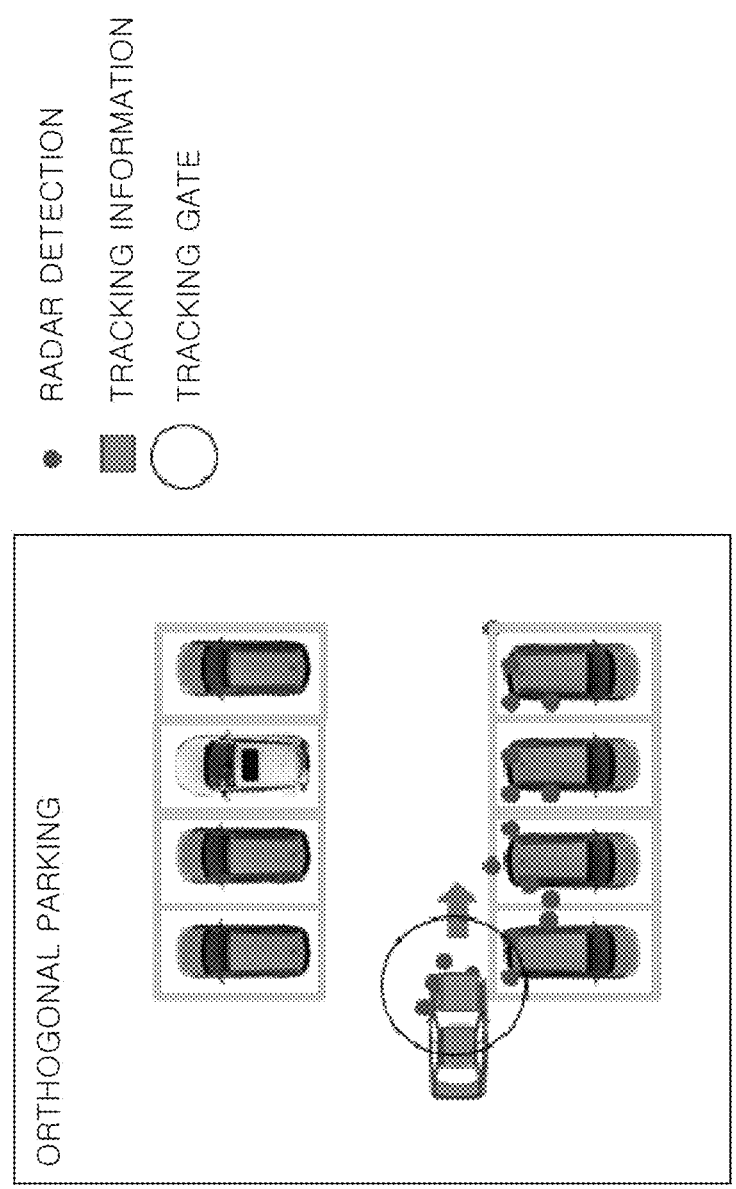

When the target vehicle moving in the parking space is detected, the ROTA system operates to set a tracking gate for tracking the detected target vehicle and to perform the above-mentioned object detection in the tracking gate, as illustrated in FIG. 27. In this case, it is difficult to extract the detection information most closely related to the target vehicle because not only the target vehicle but also object detection information from nearby parked vehicles and ghost detection information generated due to multiple reflections are mixed in the tracking gate. Selection of the detection information that is not closely related may affect tracking performance, particularly which may often occur in a situation where the target vehicle is dynamically accelerating/decelerating rather than traveling at a constant speed.

To this end, the present embodiment adopts a configuration that grasps a type of parking in a parking space in which the vehicle is parked and then controls the function of the rear cross traffic alert system according to the grasped type of parking. In this case, the control unit 200 may grasp the type of parking in the parking space by detecting a plurality of other vehicles continuously parked around the vehicle using the clustering algorithm and edge grid extraction described in "8. Continuous Structure Monitoring". That is, the continuous structures described in "8. Continuous Structure Monitoring" correspond to a plurality of other vehicles continuously parked around the vehicle.

Figure 28:
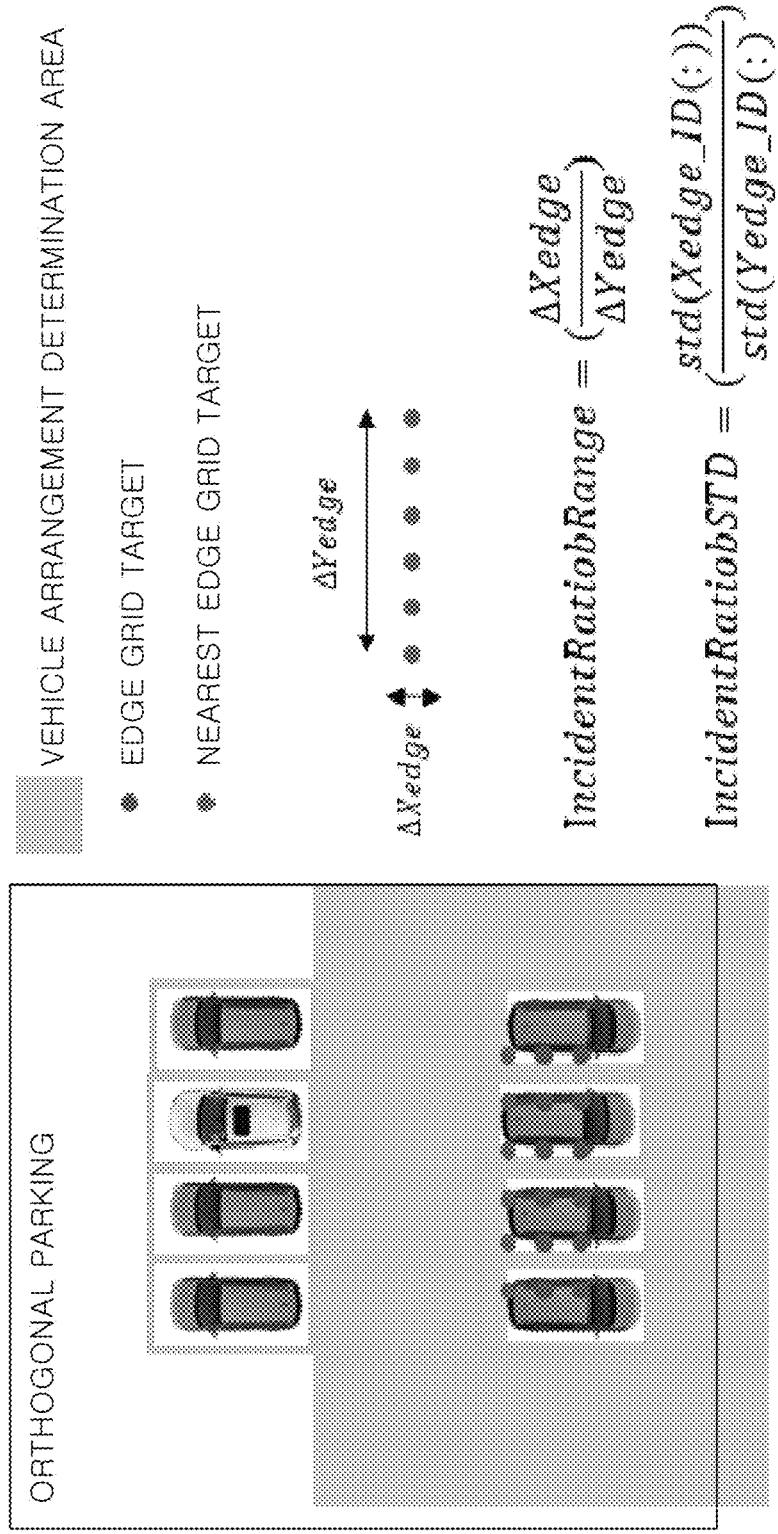

Referring to FIG. 28, the control unit 200 first checks whether the number of stationary objects in the cluster created through the above-mentioned processes is equal to or greater than a threshold value, and checks whether the number of vehicles corresponding to the nearest edge grids is equal to or greater than a threshold value. When the above conditions are satisfied, the control unit 200 may grasp the type of parking in the parking space, based on a first ratio (IncidentRatiobRange) between the longitudinal lengths ($\Delta$Xdedge) and the transverse lengths ($\Delta$Ydedge) of the plurality of other vehicles corresponding to the continuously arranged nearest edge grids and a second ratio (IncidentRatiobSTD) between the standard deviation (std(Xedge_ID(:))) of the longitudinal positions and the standard deviation (std(Yedge_ID(:))) of the transverse positions of the plurality of other vehicles. Here, the reason why only the nearest edge grid is considered is that the portion closest to the vehicle is important and is to eliminate the problem that increases the amount of computation caused when all edge grids are considered.

In this case, the control unit 200 may grasp the type of parking in the parking space by determining a parking angle corresponding to the currently determined first and second ratios using a predefined parking angle function in relation to the combination of the first and second ratios and comparing the parking angle with a preset threshold value. The type of parking may include orthogonal parking, diagonal parking, and parallel parking. The parking angle function is a function defined to determine the type of parking in the parking space in the order of orthogonal parking, diagonal parking, and parallel parking as the first and second ratios have a larger value. Accordingly, the type of parking in the parking space is determined to be orthogonal parking when the first and second ratios have a relatively low value, the type of parking in the parking space is determined to be diagonal parking when the first and second ratios have a relatively high value, and the type of parking in the parking space is determined to be parallel parking when the first and second ratios have a very high value. The parking angle function is a quantitative function using the first and second ratios as factors, which may be designed in advance by a designer and defined in the control unit 200. The following Equation 8 illustrates an example in which the type of parking is determined according to the parking angle (IncidentAnblebEdge).

$a$DETERMINATION TO BE ORTHOGONAL PARKING: 0≤|IncidentAnglebEdge|≥THRESHOLD VALUE(about 22.5°)

$b$DETERMINATION TO BE DIAGONAL PARKING: THRESHOLD VALUE(about 22.5°)≥|IncidentAnglebEdge|≤THRESHOLD VALUE (about 77.5°)

$c$DETERMINATION TO BE PARALLEL PARKING: THRESHOLD VALUE(about 77.5°)≥|IncidentAnglebEdge|≤THRESHOLD VALUE (about 90.5°) [Equation 8]

Figure 29:
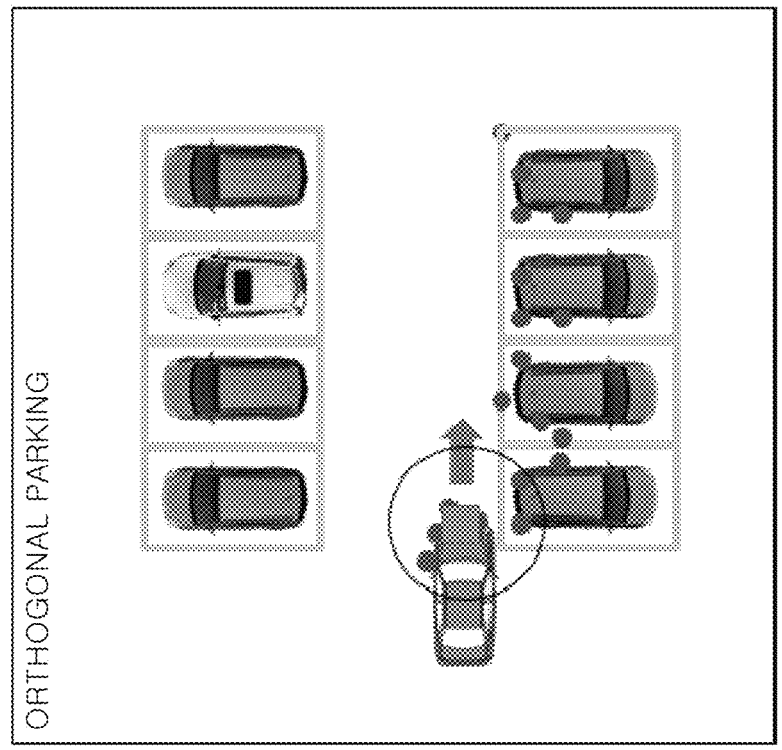
Figure 30:
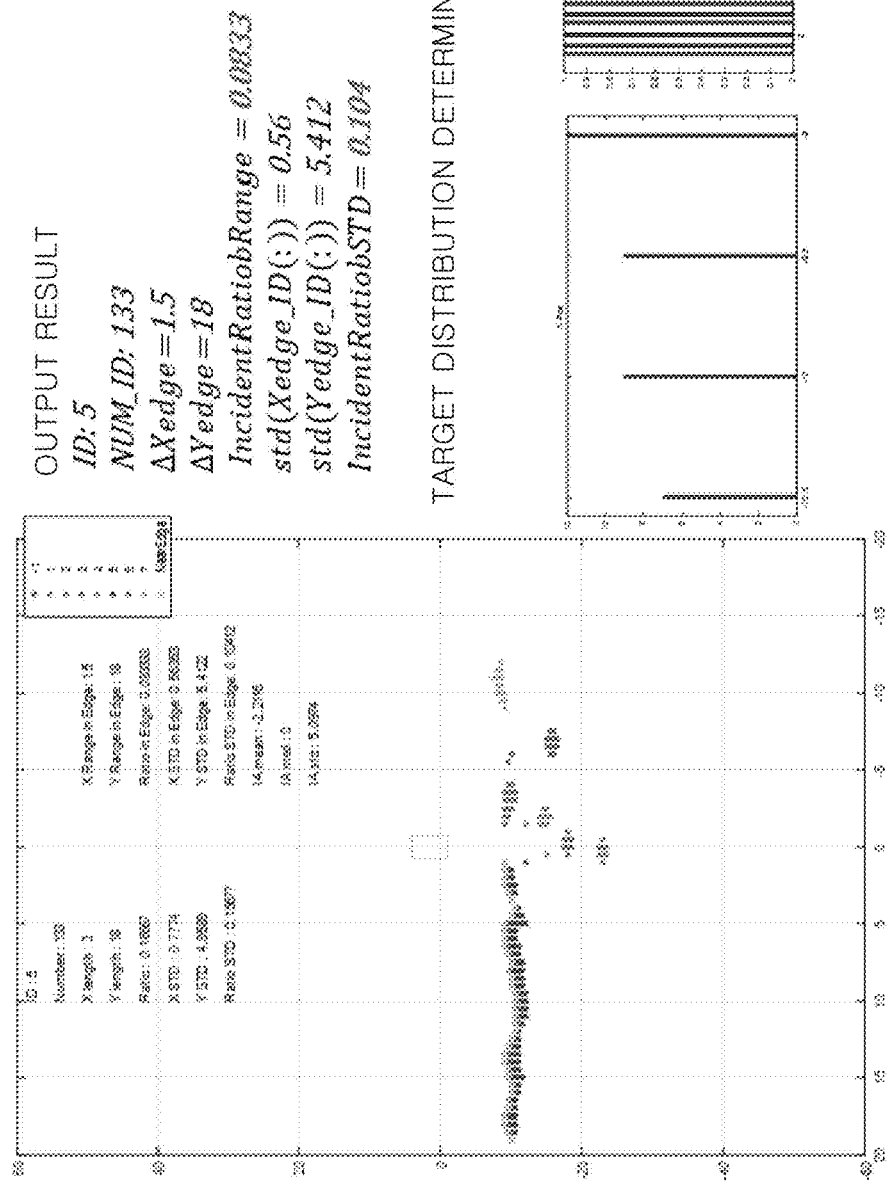
Figure 31:
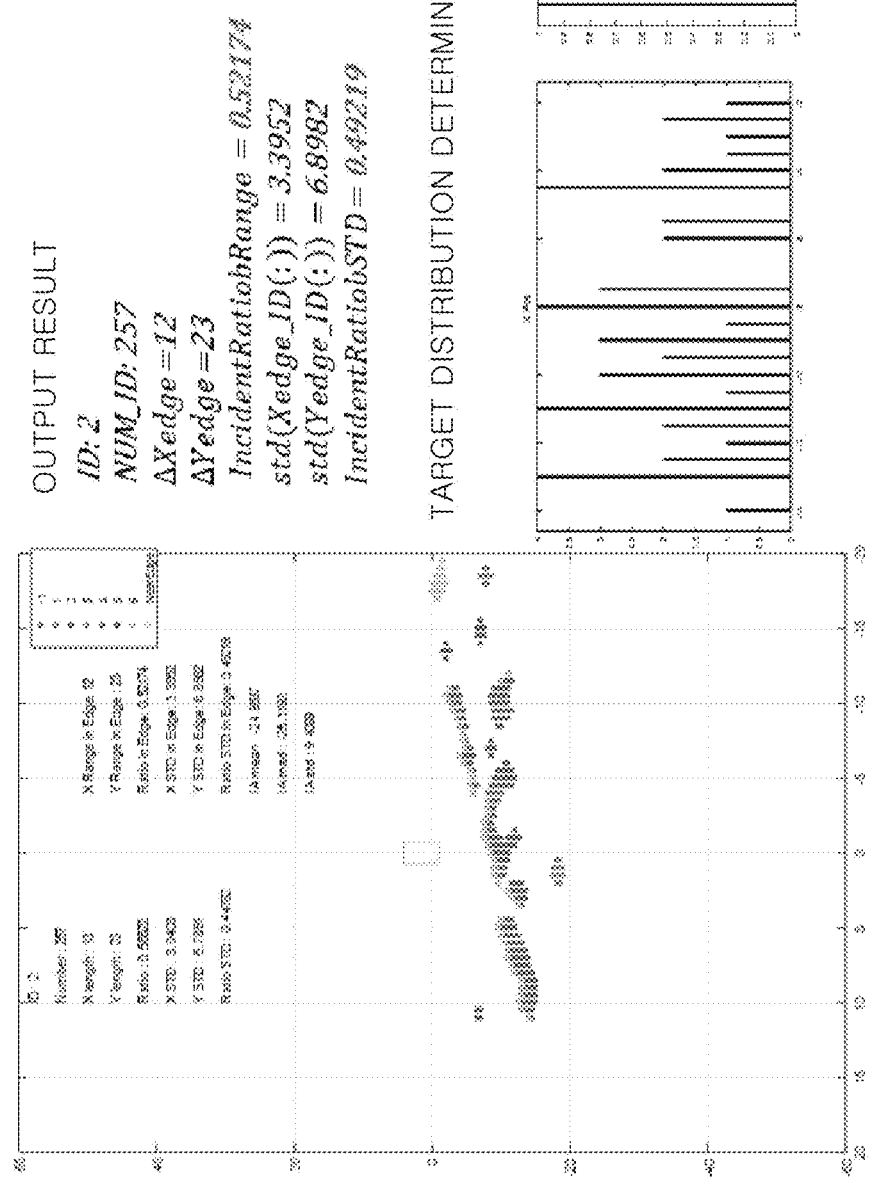

When the type of parking in the parking space is grasped, the control unit 200 may correct a form of the tracking gate of the ROTA for tracking the target vehicle moving in the parking space in response to the grasped type of parking in the parking space. Specifically, as illustrated in FIG. 29, when the type of parking in the parking space is grasped as orthogonal parking, diagonal parking, and parallel parking, the control unit 200 may correct the tracking gate in the form of an ellipse with a transverse major axis, an ellipse with a diagonal major axis, and an ellipse with a longitudinal major axis, accordingly. Therefore, the tracking gate of the ROTA may be corrected in the form of an ellipse whose major axis is directed in the movement direction of that target vehicle, resulting in an improvement in the tracking performance of the target vehicle. FIGS. 30 to 32 illustrate a result of actual vehicle verification data in orthogonal and diagonal parking situations.

Figure 33:
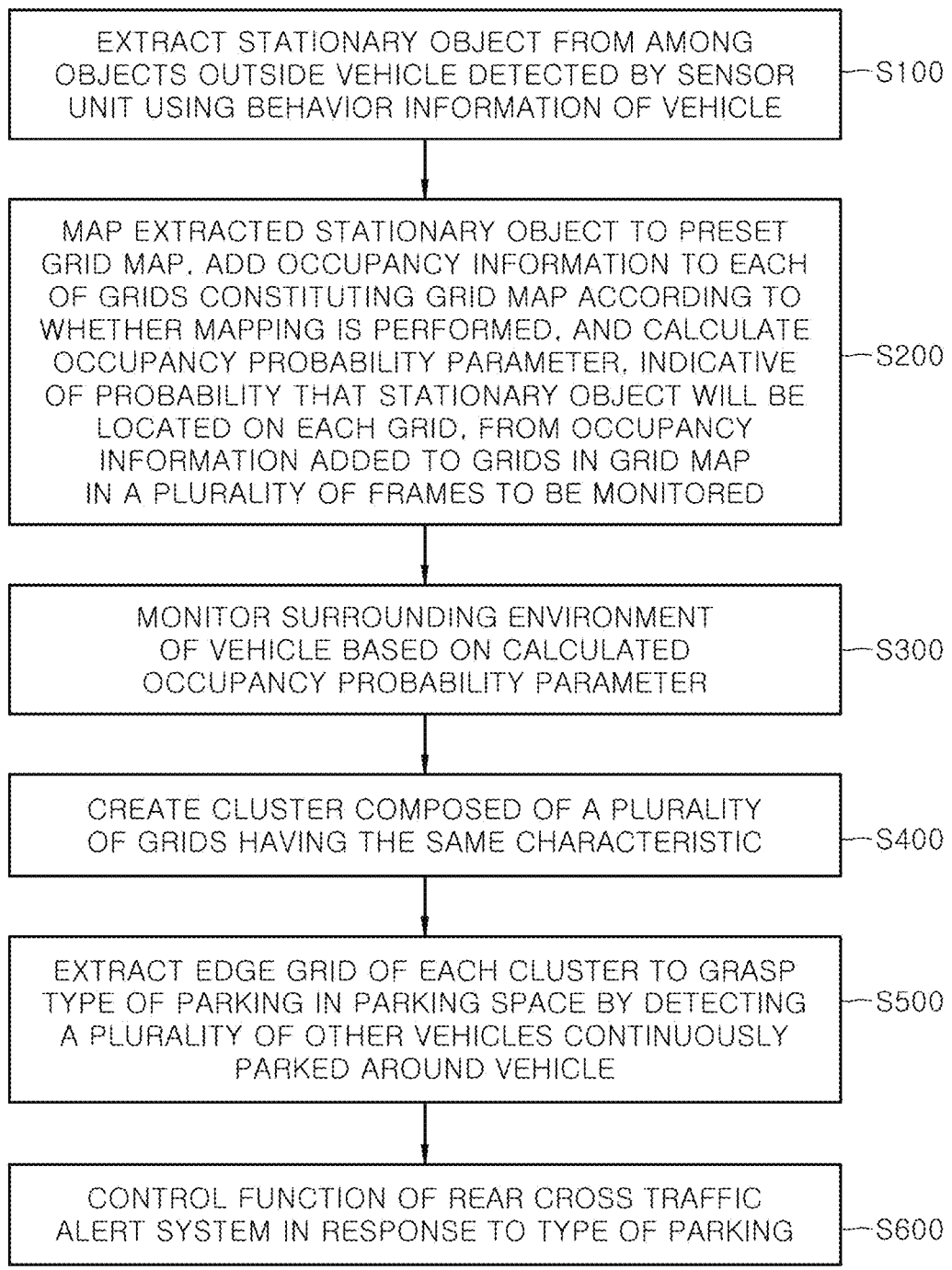
FIG. 33 is a flowchart for explaining a method of monitoring a surrounding environment of a vehicle in accordance with an embodiment of the present disclosure.

FIG. 33 is a flowchart for explaining a method of monitoring a surrounding environment of a vehicle in accordance with an embodiment of the present disclosure. The method of monitoring a surrounding environment of a vehicle in accordance with the present embodiment will be described with reference to FIG. 33. A detailed description of any part that overlaps with the foregoing will be omitted and the following description will be focused on the time-series configuration thereof.

First, the control unit 200 extracts a stationary object among objects outside the vehicle, detected by the sensor unit 100, by using the behavior information of the vehicle, in step S100.

Then, the control unit 200 maps the stationary object extracted in step S100 to a preset grid map, adds occupancy information to each of grids constituting the grid map according to whether the stationary object is mapped to the grid map, and calculates an occupancy probability parameter from the occupancy information added to the grids within the grid map in a plurality of frames to be monitored, the occupancy probability parameter indicating the probability that the stationary object will be located at the corresponding grid, in step S200.

In step S200, the control unit 200 maps the stationary object to the grid map while updating the grid map by changing the respective indexes of the grids constituting the grid map according to the behavior information of the vehicle.

Furthermore, in step S200, the control unit 200 converts the location information of the stationary object into an index corresponding to the grid map, maps the stationary object to the grid map by specifying a target grid of the grid map, corresponding to the index, adds occupancy information with a first value to the target grid to which the stationary object is mapped, and adds occupancy information with a second value to the other grids, the second value being smaller than the first value.

Furthermore, in step S200, the control unit 200 calculates an occupancy probability parameter by deciding an expanded mapping area expanded by a preset range on the basis of the target grid to which the stationary object is mapped, and adding the occupancy information with the first value to each of grids constituting the expanded mapping area.

Furthermore, in step S200, the control unit 200 corrects the occupancy probability parameters of grids constituting a second expanded mapping area by comparing a first expanded mapping area in the $(K-1)^{th}$ frame to the second expanded mapping area in the $K^{th}$ frame, when the grid map is updated as the $(K-1)^{th}$ frame is switched to the $K^{th}$ frame. Specifically, the control unit 200 specifies a first area composed of grids whose occupancy probability parameters have increased, among the grids of the second expanded mapping area, and a second area composed of grids whose occupancy probability parameters have decreased, among the grids of the first expanded mapping area, on the basis of the $K^{th}$ frame over the $(K-1)^{th}$ frame. Then, the control unit 200 corrects the respective occupancy probability parameters of the grids constituting the second expanded mapping area in the $K^{th}$ frame by substituting the occupancy probability parameters of the second area with the occupancy probability parameters of the first area.

Furthermore, in step S200, the control unit 200 corrects a shaded grid corresponding to a shaded area where the sensor unit 100 cannot detect an outside object in the $K^{th}$ frame, by using a first method of receiving an occupancy probability parameter in the $(K-1)^{th}$ frame or a second method of receiving an occupancy probability parameter of a grid around the shaded grid. In this case, the control unit 200 corrects the shaded grid according to the first method when the speed of the vehicle is equal to or higher than a preset reference value, and corrects the shaded grid according to the second method when the speed of the vehicle is lower than the reference value.

After step S200, the control unit 200 monitors the surrounding environment of the vehicle on the basis of the occupancy probability parameter calculated in step S200, in step S300. Specifically, the control unit 200 decides a peak grid having the highest occupancy probability parameter among the grids within the expanded mapping area decided for a plurality of frames to be monitored. When the occupancy probability parameter of the peak grid is equal to or larger than a threshold value defined for the peak grid, the control unit 200 determines that the stationary object is located at the peak grid. In step S300, a plurality of peak grids may be determined.

Next, the control unit 200 applies a predefined clustering algorithm to the grid specified in step S300 to create one or more clusters composed of a plurality of grids having the same characteristic (S400). In step S400, the control unit 200 uses a density based spatial clustering of applications with noise (DBSCAN) algorithm as the clustering algorithm to create one or more clusters. The clustering criterion of the DBSCAN algorithm corresponds to the distance between the peak grids where stationary objects are located.

Next, the control unit 200 extracts the edge grid of each cluster created in step S400 to grasp a type of parking in a parking space by detecting a plurality of other vehicles continuously parked around the vehicle (S500). In step S500, the control unit 200 extracts grids in which a peak grid does not exist in an immediately adjacent grid, as edge grids of the cluster, from among the grids constituting the cluster, determines nearest edge grids, which are at positions close to the vehicle, among the extracted edge grids, and when the determined nearest edge grids are continuously arranged, determines those nearest edge grids as grids on which a plurality of other vehicles continuously parked around the vehicle are located. In addition, in step S500, the control unit 200 grasps the type of parking in the parking space, based on a first ratio between the longitudinal lengths and the transverse lengths of the plurality of other vehicles corresponding to the continuously arranged nearest edge grids and a second ratio between the standard deviation of the longitudinal positions and the standard deviation of the transverse positions of the plurality of other vehicles. Specifically, the control unit 200 grasps the type of parking in the parking space by determining a parking angle corresponding to the currently determined first and second ratios using a predefined parking angle function in relation to the combination of the first and second ratios and comparing the parking angle with a preset threshold value.

Then, the control unit controls the function of the rear cross traffic alert system in response to the type of parking grasped in step S500 (S600). In step S600, the control unit corrects a form of the tracking gate of the ROTA for tracking the target vehicle moving in the parking space in response to the type of parking in the parking space. Specifically, when the type of parking in the parking space is grasped as orthogonal parking, diagonal parking, and parallel parking, the control unit corrects the tracking gate in the form of an ellipse with a transverse major axis, an ellipse with a diagonal major axis, and an ellipse with a longitudinal major axis, accordingly.

As such, the apparatus and method for monitoring the surrounding environment of a vehicle in accordance with the present embodiment may map a stationary object detected through the radar to the preset grid map, add occupancy information to each of the grids constituting the grid map depending on whether the stationary object is mapped to the grid map, and then calculate the occupancy probability parameter from the occupancy information added to each of the grids within the grid map in a plurality of frames to be monitored, the occupancy probability parameter indicating that the probability that the stationary object will be located at the corresponding grid, in order to monitor the surrounding environment of the vehicle. Thus, the apparatus and method can improve the detection accuracy for the outside object when monitoring the surrounding environment of the vehicle through the radar.

The apparatus and method for monitoring the surrounding environment of a vehicle in accordance with the present embodiment may improve detection accuracy for an outside object when monitoring the surrounding environment of the vehicle through a radar.

The apparatus and method for monitoring the surrounding environment of a vehicle in accordance with the present embodiment may map a stationary object detected through the radar to the preset grid map, add occupancy information to each of the grids constituting the grid map depending on whether the stationary object is mapped to the grid map, and then calculate the occupancy probability parameter from the occupancy information added to each of the grids within the grid map in a plurality of frames to be monitored, the occupancy probability parameter indicating that the probability that the stationary object will be located at the corresponding grid, in order to monitor the surrounding environment of the vehicle. Thus, the apparatus and method can improve the detection accuracy for the outside object when monitoring the surrounding environment of the vehicle through the radar.

The controller 200, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. In an example, the processor also includes a communication device, such as a computer, cellular phone, PDA (Personal Digital Assistant) and another device, which facilitates information communication between end users.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method described herein. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for monitoring a surrounding environment of a vehicle, comprising:
    a sensor unit comprising a plurality of detection sensors for detecting an object outside a vehicle according to a frame at a time period; and
    a controller configured to
        extract a stationary object from among the outside objects detected by the sensor unit,
        map the extracted stationary object to a grid map,
        calculate an occupancy probability parameter, indicative of a probability of the stationary object being located on a grid of the grid map, from a result of mapping,
        monitor the surrounding environment of the vehicle by specifying the grid on which the stationary object is located in the grid map, based on the occupancy probability parameter,
        apply a clustering algorithm to the specified grid to create a cluster composed of a plurality of grids having the same characteristic,
        determine a type of parking in a parking space by extracting an edge grid of the cluster to detect a plurality of other vehicles continuously parked around the vehicle, and
        control a function of a rear cross traffic alert (ROTA) system, in response to the type of parking.

2. The apparatus according to claim 1, wherein the controller is further configured to determine a peak grid with a maximum occupancy probability parameter from among grids in the grid map, and to determine that the stationary object is located on the peak grid, in response to the occupancy probability parameter of the peak grid being equal to or greater than a threshold value for the peak grid, and the peak grid on which the stationary object is determined to be located comprises a plurality of peak grids.

3. The apparatus according to claim 2, wherein the controller is further configured to use a density based spatial clustering of applications with noise (DBSCAN) algorithm as the clustering algorithm to create one or more clusters, and the clustering criterion of the DBSCAN algorithm corresponds to a distance between the plurality of peak grids where the stationary object is determined to be located.

4. The apparatus according to claim 3, wherein the controller is further configured to:
    extract grids in which a peak grid does not exist in an immediately adjacent grid, as edge grids of each cluster, from among the grids constituting the cluster; and
    determine nearest edge grids, which are at positions closest to the vehicle, from among the extracted edge grids, and to determine the nearest edge grids as grids on which the plurality of other vehicles are continuously parked around the vehicle are located, in response to the nearest edge grids being continuously arranged.

5. The apparatus according to claim 4, wherein the controller is further configured to determine the type of parking in the parking space, based on a first ratio between longitudinal and transverse lengths of the plurality of other vehicles corresponding to the continuously arranged nearest edge grids and a second ratio between a standard deviation of longitudinal positions and a standard deviation of transverse positions of the plurality of other vehicles.

6. The apparatus according to claim 5, wherein the controller is further configured to determine the type of parking in the parking space by determining a parking angle corresponding to the first and second ratios using a parking angle function in relation to a combination of the first and second ratios and comparing the parking angle with a threshold value, and the type of parking comprises one of orthogonal parking, diagonal parking, and parallel parking.

7. The apparatus according to claim 6, wherein the controller is further configured to correct a form of a tracking gate of the ROTA for tracking a target vehicle moving in the parking space based on the type of parking in the parking space.

8. The apparatus according to claim 7, wherein the controller is further configured to correct the tracking gate in the form of an ellipse with a transverse major axis, an ellipse with a diagonal major axis, and an ellipse with a longitudinal major axis, in response to the type of parking in the parking space being one of the orthogonal parking, the diagonal parking, and the parallel parking, respectively.

9. A processor-implemented method of monitoring a surrounding environment of a vehicle, comprising:
   extracting, by a controller, a stationary object from among objects, outside a vehicle, detected by a sensor unit comprising a plurality of detection sensors for detecting the outside objects of the vehicle according to a frame at a time period;
   mapping, by the controller, the extracted stationary object to a preset grid map,
   calculating, by the controller, an occupancy probability parameter indicative of a probability that the stationary object being located on a grid of the grid map from a result of mapping;
   monitoring, by the controller, the surrounding environment of the vehicle by specifying the grid on which the stationary object is located in the grid map, based on the occupancy probability parameter;
   creating, by the controller, a cluster composed of a plurality of grids having the same characteristic by applying a predefined clustering algorithm to the specified grid;
   determining, by the controller, a type of parking in a parking space by extracting an edge grid of the cluster to detect a plurality of other vehicles continuously parked around the vehicle; and
   controlling, by the controller, a function of a rear cross traffic alert (ROTA) system in response to the type of parking.

10. The method according to claim 9, wherein the monitoring of the surrounding environment of the vehicle comprises determining a peak grid with a maximum occupancy probability parameter from among grids in the grid map, and determining that the stationary object is located on the peak grid, in response to the occupancy probability parameter of the peak grid being equal to or greater than a threshold value defined for the peak grid, and the peak grid on which the stationary object is determined to be located comprises a plurality of peak grids.

11. The method according to claim 10, wherein the creating of the cluster comprises using a density based spatial clustering of applications with noise (DBSCAN) algorithm as the clustering algorithm to create one or more clusters, and the clustering criterion of the DBSCAN algorithm corresponds to a distance between the plurality of peak grids where the stationary object is determined to be located.

12. The method according to claim 11, wherein the determining of the type of parking in the parking space comprises:
   extracting grids in which a peak grid does not exist in an immediately adjacent grid, as edge grids of each cluster, from among the grids constituting the cluster, and
   determining nearest edge grids, which are at positions closest to the vehicle, from among the extracted edge grids, and determining those nearest edge grids as grids on which the plurality of other vehicles are continuously parked around the vehicle are located, in response to the determined nearest edge grids being continuously arranged.

13. The method according to claim 12, wherein the determining of the type of parking in the parking space comprises determining the type of parking in the parking space, based on a first ratio between longitudinal and transverse lengths of the plurality of other vehicles corresponding to the continuously arranged nearest edge grids and a second ratio between a standard deviation of longitudinal positions and a standard deviation of transverse positions of the plurality of other vehicles.

14. The method according to claim 13, wherein determining of the type of parking in the parking space comprises determining the type of parking in the parking space by determining a parking angle corresponding to the first and second ratios using a parking angle function in relation to a combination of the first and second ratios and comparing the parking angle with a threshold value, and the type of parking comprises one of orthogonal parking, diagonal parking, and parallel parking.

15. The method according to claim 14, wherein the controlling of the function of the rear cross traffic alert (ROTA) system comprises correcting a form of a tracking gate of the ROTA for tracking a target vehicle moving in the parking space based on the type of parking in the parking space.

16. The method according to claim 15, wherein the controlling of the function of the rear cross traffic alert (ROTA) system comprises correcting the tracking gate in the form of an ellipse with a transverse major axis, an ellipse with a diagonal major axis, and an ellipse with a longitudinal major axis, in response to the type of parking in the parking space being one of the orthogonal parking, the diagonal parking, and the parallel parking, respectively.

* * * * *